United States Patent
Erdem

(10) Patent No.: US 7,127,081 B1
(45) Date of Patent: Oct. 24, 2006

(54) METHOD FOR TRACKING MOTION OF A FACE

(75) Inventor: A. Tanju Erdem, Rochester, NY (US)

(73) Assignee: Momentum Bilgisayar, Yazilim, Danismanlik, Ticaret, A.S.

( * ) Notice: Subject to any disclaimer, the term of this patent is extended or adjusted under 35 U.S.C. 154(b) by 423 days.

(21) Appl. No.: 09/689,565

(22) Filed: Oct. 12, 2000

(51) Int. Cl.
G06K 9/00 (2006.01)

(52) U.S. Cl. ............... 382/103; 382/285; 348/169

(58) Field of Classification Search ........... 382/103, 382/100, 107, 115, 116, 117, 118, 209, 203, 382/276, 291, 106, 154, 162, 168, 189, 236, 382/243, 255, 274, 285, 287, 295, 305; 345/622, 345/630, 156, 419, 420, 474; 340/945, 326, 340/946, 981, 309.7, 14.07; 600/424; 348/94, 348/169
See application file for complete search history.

(56) References Cited

U.S. PATENT DOCUMENTS

| | | |
|---|---|---|
| 4,975,960 A | 12/1990 | Petajan |
| 5,280,530 A | 1/1994 | Trew et al. |
| 5,744,953 A | 4/1998 | Hansen |
| 5,774,591 A | 6/1998 | Black et al. |
| 5,802,220 A | 9/1998 | Black et al. |

(Continued)

FOREIGN PATENT DOCUMENTS

EP   0 926 628 A   6/1999

(Continued)

OTHER PUBLICATIONS

Tomasi, Carlo, et al., "Shape and Motion From Image Streams Under Orthography :A Factorization Method", *International Journal of Computer Vision*, vol. 9, No. 2, pp. 137-154, (1992).

(Continued)

*Primary Examiner*—Kanjibhai Patel
*Assistant Examiner*—Seyed Azarian
(74) *Attorney, Agent, or Firm*—Hiscock & Barclay, LLP; Thomas R. FitzGerald, Esq.

(57) ABSTRACT

A method for tracking the motion of a person's face for the purpose of animating a 3-D face model of the same or another person is disclosed. The 3-D face model carries both the geometry (shape) and the texture (color) characteristics of the person's face. The shape of the face model is represented via a 3-D triangular mesh (geometry mesh), while the texture of the face model is represented via a 2-D composite image (texture image). Both the global motion and the local motion of the person's face are tracked. Global motion of the face involves the rotation and the translation of the face in 3-D. Local motion of the face involves the 3-D motion of the lips, eyebrows, etc., caused by speech and facial expressions. The 2-D positions of salient features of the person's face and/or markers placed on the person's face are automatically tracked in a time-sequence of 2-D images of the face. Global and local motion of the face are separately calculated using the tracked 2-D positions of the salient features or markers. Global motion is represented in a 2-D image by rotation and position vectors while local motion is represented by an action vector that specifies the amount of facial actions such as smiling-mouth, raised-eyebrows, etc.

44 Claims, 12 Drawing Sheets

U.S. PATENT DOCUMENTS

| | | | |
|---|---|---|---|
| 5,805,745 A * | 9/1998 | Graf | 382/291 |
| 5,807,284 A | 9/1998 | Foxlin | |
| 5,907,626 A | 5/1999 | Toklu et al. | |
| 5,923,337 A | 7/1999 | Yamamoto | |
| 5,982,909 A | 11/1999 | Erdem et al. | |
| 6,009,210 A * | 12/1999 | Kang | 382/276 |
| 6,016,148 A * | 1/2000 | Kang et al. | 345/622 |
| 6,020,892 A | 2/2000 | Dillon | |
| 6,028,960 A * | 2/2000 | Graf et al. | 382/203 |
| 6,031,539 A | 2/2000 | Kang et al. | |
| 6,037,949 A | 3/2000 | DeRose et al. | |
| 6,047,078 A | 4/2000 | Kang | |
| 6,052,132 A * | 4/2000 | Christian et al. | 345/474 |
| 6,064,390 A | 5/2000 | Sagar et al. | 345/420 |
| 6,175,756 B1 * | 1/2001 | Ferre et al. | 600/424 |
| 6,204,860 B1 * | 3/2001 | Singh | 345/420 |
| 6,272,231 B1 * | 8/2001 | Maurer et al. | 382/103 |

FOREIGN PATENT DOCUMENTS

| | | |
|---|---|---|
| JP | 8293026 A | 11/1996 |
| WO | WO 98 01830 | 1/1998 |
| WO | WO 9906962 A | 2/1999 |
| WO | PCT/IB01/02735 | 6/2002 |
| WO | PCT/IB01/02736 | 7/2002 |
| WO | PCT/IB01/02363 | 8/2002 |

OTHER PUBLICATIONS

Terzopoulos, et al., "Analysis and Synthesis of Facial Image Sequences Using Physical and Anatomical Models", *IEEE Transactions on Pattern Analysis and Machines Intelligence (PAMI)*, vol. 15, No. 6, pp. 569-579, (Jun. 1993).

Essa, Irfan A., et al., "A Vision System for Observing and Extracting Facial Action Parameters", *Proceedings of CVPR*, Seattle, Washington, pp. 36-42 & 76-83, (Jun. 1994).

Smolic, Aljoscha, et al., "Real-Time Estimation of Long-Term 3-D Motion Parameters for SNHC Face Animation and Model-Based Coding Applications", *IEEE Transactions on Circuits and Systems for Video Technology*, vol. 9, No. 2, pp. 255-263, (Mar. 1999).

Yokoya, Naokazu, et al., "Motion Tracking of Deformable Objects by Active Contour Models Using Multiscale Dynamic Programming", *Journal of Visual Communication and Image Representation*, vol. 4, pp. 382-391, (Dec. 1993).

Bascle, Benedicte, et al., "Tracking Computer Primitive in An Image Sequence", *IEEE International Conference Pattern Recognition*, Israel, pp. 426-431, (Oct. 1994).

Meyer, Francois G., et al., "Region-Based Tracking Using Affine Motion Modes in Long Image Sequences", *CVGIP: Image Understanding*, vol. 60, pp. 119-140, (Sep. 1994).

Antoszczysyn, Paul M., et al., "Tracking of the Motion of Important Facial Features in Model-Based Coding", *Signal Processing*, No. 66, pp. 249-260, (1998).

Petajan, Eric, Dr., "Very Low Bitrate Face Animation Coding in MPEG-4", *Lucent Technologies Technical Report*, pp. 1-33.

Isard, Michael, et al., "Contour Tracking by Stochastic Propagation of Conditional Density", *Proceedings of European Conferene on Computer Vision*, Cambridge, UK, pp. 343-356, (1996).

Bascle, B., et al., "Separability of Pose and Expression in Facial Tracking and Animation", *Proceedings of 6th International Conference on Computer Vision*, pp. 323-328, (1998).

Blake, Andrew, et al., "3D-Position, Attitude, and Shape Input Using Video Tracking of Hands and Lips", *Computer Graphics (SIGGRAPH 1994)*, pp. 185-192, (1994).

Toyama, Kentaro, "Prolegomena For Robust Face Tracking", *Microsoft Research Technical Report*, MSR-TR-98-65, pp. 1-15, (Nov. 13, 1998).

Terzopoulos, D., et al., "Tracking and Kalman Snakes", *Active Vision*, (Ed. A. Blake and A. Yuille), pp. 3-20, (1992).

Li-An Tang et al: "Analysis-based facial expression synthesis" Proceedings of the International Conference of Image Processing (ICIP) Austin, Nov. 13-16, 1994 Los Alamitos, IEEE Comp. Soc. Press, US, vol. 3 Conf. 1, Nov. 13, 1994, pp. 98-102 XP010146456 ISBN: 0-8186-6952-7 the whole document.

Cosi P et al: "Phonetic recognition by recurrent neural networks working on audio and visual information" Speech Communication, Elsevier Science Publishers, Amsterdam, NL, vol. 19, No. 3, Sep. 1, 1996, pp. 245-252, XP004013654 ; ISSN: 0167-6393 p. 246, right hand column, line 13-p. 248, right-hand column, line 7.

Guenther, Brian; Grimm, Cindy; Wood, Daniel; Malvar, Henrique; Pighin Fredrick: "Making faces" Computer Graphics, Proceedings, Siggraph 98 Conference Proceedings, Proceedings of Siggraph 98: 25th International Conference on Computer Graphics and Interactive Techniques, Orlando, FL, USA, Jul. 19-24, 1998, pp. 55-66, XP002205956 1998, New York, NY, USA, ACM, USA ISBN: 0-89791-999-8 p. 56, paragraph 2-p. 59, paragraph 3.3.3.

Ebihara K et al: Real-Time 3-D Facial Image Reconstruction for Virtual Space Teleconferencing Electronics & Communications in Japan, Part 111-Fundamental Electronic Science, Scripta Technica, NY, US, vol. 82, No. 5, May 1999, pp. 80-90, XP000875659 ISSN:1042-0967 p. 80, left-hand column, line1 -p.81, rt-hand col. ln 5.

Chen T: "Technologies for building networked collaborative environments" Image Processing, 1999, ICIP 99. Proceedings. 1999 International Conference on Kobe, Japan, Oct. 24-28, 1999, Piscataway, NJ, USA, IEEE, US, Oct. 24, 1999, pp. 16-20, XP010368845, ISBN: 0-7803-5467-2, p. 18, paragraph 2.3-p. 19, paragraph 2.4.

Lande C et al: "An MPEG-4 facial animation system driven by synthetic speech" Multimedia Modeling, 1998. MMM '98. Proceedings. 1998 Lausanne, Switzerland Oct. 12-15, 1998, Los Alamitos, CA. USA, IEEE Comput. Soc. US, Oct. 12, 1998, pp. 203-212, XP010309519, ISBN: 0-8186-8911-0, p. 1, left-hand column, line1-p. 207, right-hand column, line 30.

Lavagetto F et al: "The Facial Animation Engine: Toward a High-Level Interface for the Design of MPEG-4 Compliant Animated Faces" IEEE Transactions on Circuits and Systems for Video Technology, IEEE Inc. New York, US, vol. 9, No. 2, Mar. 1999, pp. 277-289, XP000805532, ISSN:1051-8215 p. 278, left-hand column, line11-line 22; p. 279, left-hand column, line 23-p. 282, left-hand column, line 39.

\* cited by examiner

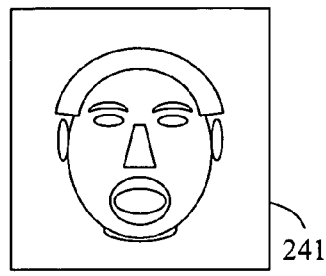
241
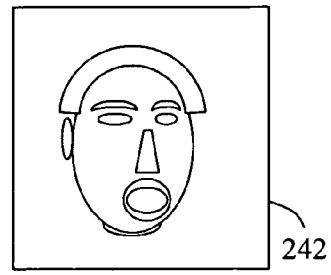
242
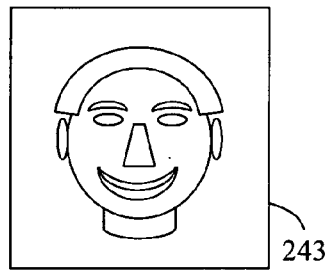
243
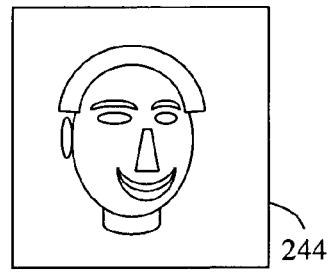
244
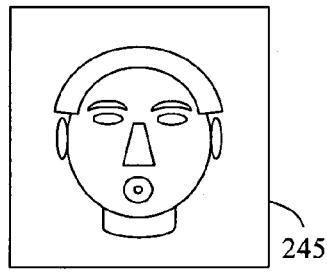
245
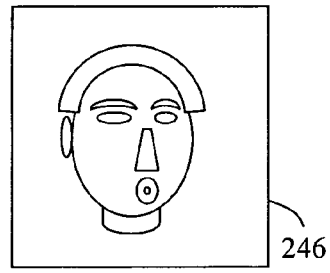
246
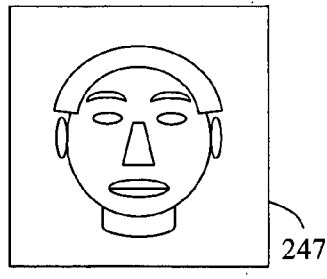
247
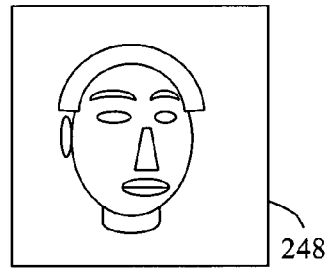
248
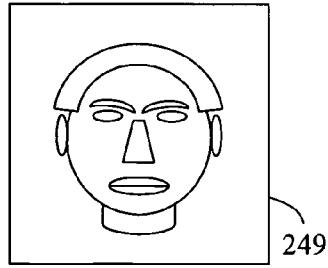
249
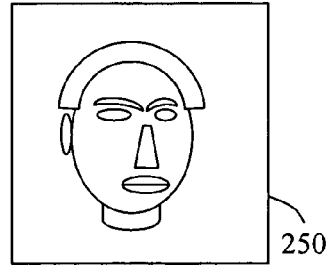
250
FIG. 8

| Markers →<br><br>Neutral Images ↓ | Right-ear-base 251 | Left-ear-base 252 | Right-temple 253 | Left-temple 254 | Right-outer-forehead 255 | Left-outer-forehead 256 | Right-central-forehead 257 | Left-central-forehead 258 | Nose-base 259 | Nose-tip 260 | Right-lip-corner 261 | Left-lip-corner 262 | Upper-lip-center 263 | Lower-lip-center 264 | Right-central-eyebrow 265 | Left-central-eyebrow 266 |
|---|---|---|---|---|---|---|---|---|---|---|---|---|---|---|---|---|
| Front 221 | X | X | X | X | X | X | X | X | X | X | X | X | X | X | X | X |
| Forehead 222 | X | X | X | X | X | X | X | X | X | X | X | X | X | X | X | X |
| Chin 223 | X | X | X | X | X | X | X | X | X | X | X | X | X | X | X | X |
| Angled-right 224 | X |  | X |  | X | X | X | X | X | X | X | X | X | X | X | X |
| Angled-right-tilted-down 225 | X |  | X |  | X | X | X | X | X | X | X | X | X | X | X | X |
| Angled-right-tilted-up 226 | X |  | X |  | X | X | X | X | X | X | X | X | X | X | X | X |
| Angled-left 227 |  | X |  | X | X | X | X | X | X | X | X | X | X | X | X | X |
| Angled-left-tilted-down 228 |  | X |  | X | X | X | X | X | X | X | X | X | X | X | X | X |
| Angled-left-tilted-up 229 |  | X |  | X | X | X | X | X | X | X | X | X | X | X | X | X |
| Full-right-profile 230 | X |  | X |  | X |  | X |  | X | X | X |  | X | X | X | X |
| Full-right-profile-tilted-down 231 | X |  | X |  | X |  | X |  | X | X | X |  | X | X | X | X |
| Full-right-profile-tilted-up 232 | X |  | X |  | X |  | X |  | X | X | X |  | X | X | X | X |
| Full-left-profile 233 |  | X |  | X |  | X |  | X | X | X |  | X | X | X | X |  |
| Full-left-profile-tilted-down 234 |  | X |  | X |  | X |  | X | X | X |  | X | X | X | X |  |
| Full-left-profile-tilted-up 235 |  | X |  | X |  | X |  | X | X | X |  | X | X | X | X |  |

FIG. 9

| Markers → <br><br> Action Images ↓ | Right-ear-base 251 | Left-ear-base 252 | Right-temple 253 | Left-temple 254 | Right-outer-forehead 255 | Left-outer-forehead 256 | Right-central-forehead 257 | Left-central-forehead 258 | Nose-base 259 | Nose-tip 260 | Right-lip-corner 261 | Left-lip-corner 262 | Upper-lip-center 263 | Lower-lip-center 264 | Right-central-eyebrow 265 | Left-central-eyebrow 266 |
|---|---|---|---|---|---|---|---|---|---|---|---|---|---|---|---|---|
| Front-mouth-yawning 241 | X | X | X | X | X | X | X | X | X | X |   |   |   |   | X | X |
| Angled-right-mouth-yawning 242 | X |   | X |   | X | X | X | X | X | X |   |   |   |   | X | X |
| Front-mouth-smiling 243 | X | X | X | X | X | X | X | X | X | X |   |   |   |   | X | X |
| Angled-right-mouth-smiling 244 | X |   | X |   | X | X | X | X | X | X |   |   |   |   | X | X |
| Front-mouth-kissing 245 | X | X | X | X | X | X | X | X | X | X |   |   |   |   | X | X |
| Angled-right-mouth-kissing 246 | X |   | X |   | X | X | X | X | X | X |   |   |   |   | X | X |
| Front-raised-eyebrows 247 | X | X | X | X | X | X | X | X | X | X | X | X | X | X |   |   |
| Angled-right-raised-eyebrows 248 | X |   | X |   | X | X | X | X | X | X | X | X | X | X |   |   |
| Front-squeezed-eyebrows 249 | X | X | X | X | X | X | X | X | X | X | X | X | X | X |   |   |
| Angled-right-squeezed-eyebrows 250 | X |   | X |   | X | X | X | X | X | X | X | X | X | X |   |   |

FIG. 10

| Skull Marker Name | Surface Normal |
|---|---|
| Right-ear-base 251 | (-1.0, 0.0, 0.5) |
| Left-ear-base 252 | (1.0, 0.0, 0.5) |
| Right-temple 253 | (-1.0, 0.2, 0.4) |
| Left-temple 254 | (1.0, 0.2, 0.4) |
| Right-outer-forehead 255 | (-1.0, 0.4, 0.8) |
| Left-outer-forehead 256 | (1.0, 0.4, 0.8) |
| Right-central-forehead 257 | (-0.6, 0.8, 1.0) |
| Left-central-forehead 258 | (0.6, 0.8, 1.0) |
| Nose-base 259 | (0.0, 0.6, 1.0) |
| Nose-tip 260 | (0.0, 0.2, 1.0) |

FIG. 11

| Joint Marker Name | Surface Normal | Motion Plane Basis Vector 1 | Motion Plane Basis Vector 2 |
|---|---|---|---|
| Right-lip-corner 261 | (-1.0, 0.0, 1.0) | (1.0, 0.0, 1.0) | (0.0, -1.0, 0.0) |
| Left-lip-corner 262 | (1.0, 0.0, 1.0) | (-1.0, 0.0, 1.0) | (0.0, -1.0, 0.0) |
| Upper-lip-center 263 | (0.0, 0.0, 1.0) | (0.0, 0.0, 1.0) | (0.0, 1.0, 0.0) |
| Lower-lip-center 264 | (0.0, 0.0, 1.0) | (0.0, 0.0, 1.0) | (0.0, -1.0, 0.0) |
| Right-central-eyebrow 265 | (-0.1, 0.0, 1.0) | (-1.0, 0.0, 0.0) | (0.0, 1.0, 0.0) |
| Left-central-eyebrow 266 | (0.1, 0.0, 1.0) | (1.0, 0.0, 0.0) | (0.0, 1.0, 0.0) |

FIG. 12

METHOD FOR TRACKING MOTION OF A FACE

FIELD OF THE INVENTION

The present invention is related to the field of digital video processing and analysis, and more specifically, to a technique for tracking the three-dimensional (3-D) motion of a person's face from a sequence of two-dimensional (2-D) images of the person's face that are sequentially received in chronological order.

BACKGROUND OF THE INVENTION

Tracking the 3-D motion of a face in a sequence of 2-D images of the face is an important problem with applications to facial animation, hands-free human-computer interaction environment, and lip-reading. Tracking the motion of the face involves tracking the 2-D positions of salient features on the face. The salient features could be in the form of (i) points, such as the corners of the mouth, the eye pupils, or external markers placed on the face; (ii) lines, such as the hair-line, the boundary of the lips, and the boundary of eyebrows; and (iii) regions, such as the eyes, the nose, and the mouth. There are known techniques for using markers to track objects such as selected facial features including eyebrows, ears, mouth and corners of the eyes.

The salient features can also be synthetically created by placing markers on the face. Tracking of salient features is generally accomplished by detecting and matching a plurality of salient features of the face in a sequence of 2-D images of the face. The problem of detecting and matching the salient features is made difficult by variations in illumination, occlusion of the features, poor video quality, and the real-time constraint on the computer processing of the 2-D images.

SUMMARY OF THE INVENTION

The present invention provides an improvement designed to satisfy the aforementioned needs. Particularly, the present invention is directed to a computer program product for tracking the motion of a person's face from a chronologically ordered sequence of images of the person's face for the purpose of animating a 3-D model of the same or another person's face, by performing the steps of: (a) receiving a sequence of 2-D images of a person's face; (b) tracking the salient features of the person's face in the 2-D images; and (c) obtaining the 3-D global and local motion of the face from the tracked 2-D location of the salient features.

BRIEF DESCRIPTION OF THE DRAWINGS

In the course of the following detailed description, reference will be made to the attached drawings in which:

FIG. 8 is a diagram further illustrating the method of acquiring a plurality of action images of a person's face using the camera;

FIG. 9 is a first table illustrating the method of locating global and local markers on the person's face;

FIG. 10 is a second table illustrating the method of locating global and local markers on the person's face;

FIG. 11 is a table illustrating the method of determining the surface normals of the global markers;

FIG. 12 is a table illustrating the method of determining the surface normals and the motion planes of the local markers;

DETAILED DESCRIPTION OF THE INVENTION

Figure 1:
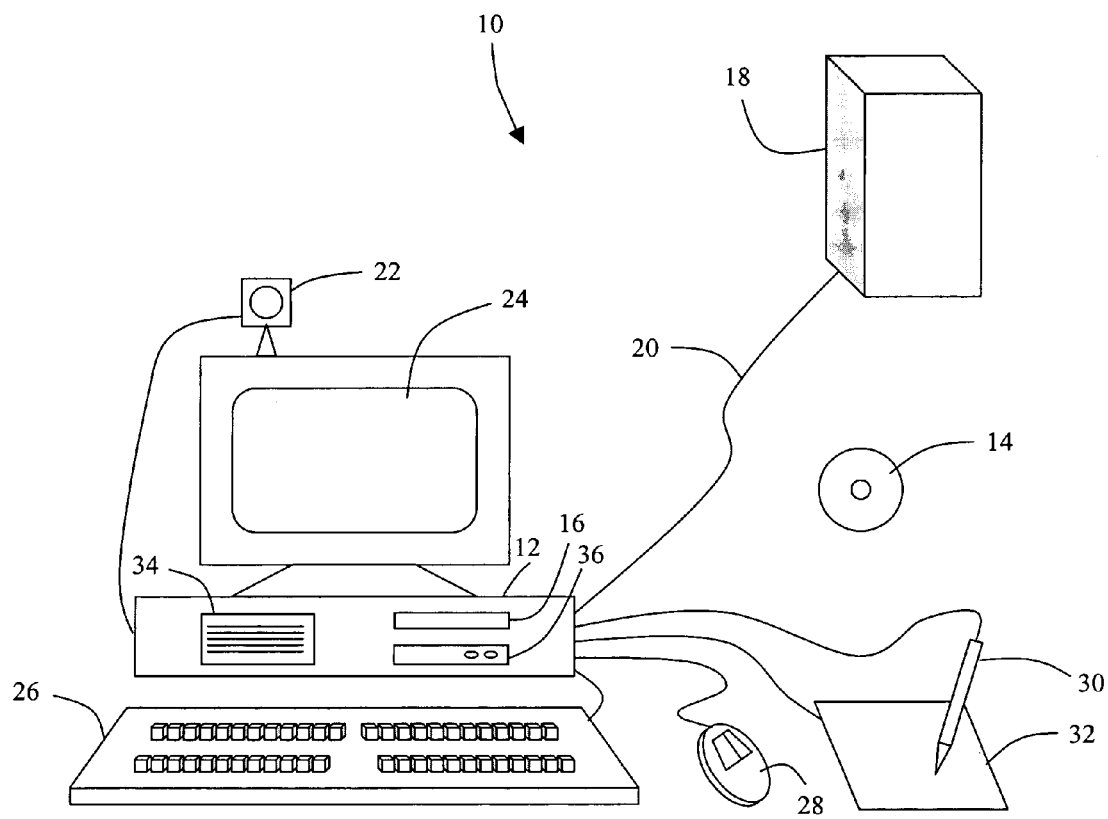
FIG. 1 is a perspective view of a computer system for implementing the present invention.

Referring to FIG. 1, there is illustrated a computer system 10 for implementing the present invention. The computer system 10 includes a microprocessor-based unit 12 for receiving and processing software programs and for performing other well known processing functions. The software programs are contained on a computer useable medium 14, typically a compact disk, and are input into the microprocessor based unit 12 via the compact disk player 16 electronically connected to the microprocessor-based unit 12. As an alternate to using the compact disk 14, programs could also be contained in an Internet server 18 and input into the microprocessor-based unit 12 via an Internet connection 20. A camera 22 is electronically connected to the microprocessor-based unit 12 to capture the 2-D images of a person's face. A display 24 is electronically connected to the microprocessor-based unit 12 for displaying the images and user related information associated with the software. A keyboard 26 is connected to the microprocessor based unit 12 for allowing a user to input information to the software. A mouse 28 is also connected to the microprocessor based unit 12 for selecting items on the display 24 or for entering 2-D position information to the software, as is well known in the art. As an alternate to using the mouse 28, a digital pen 30 and a digital pad 32 may be used for selecting items on the display 24 and entering position information to the software. The output of the computer system is either stored on a hard disk 34 connected to the microprocessor unit 12, or uploaded to the Internet server 18 via the Internet connection 20. Alternatively, the output of the computer system can be stored on another computer useable medium 14, typically a compact disk, via a compact disk writer 36. The below-described steps of the present invention are implemented on the computer system 10.

Figure 2:
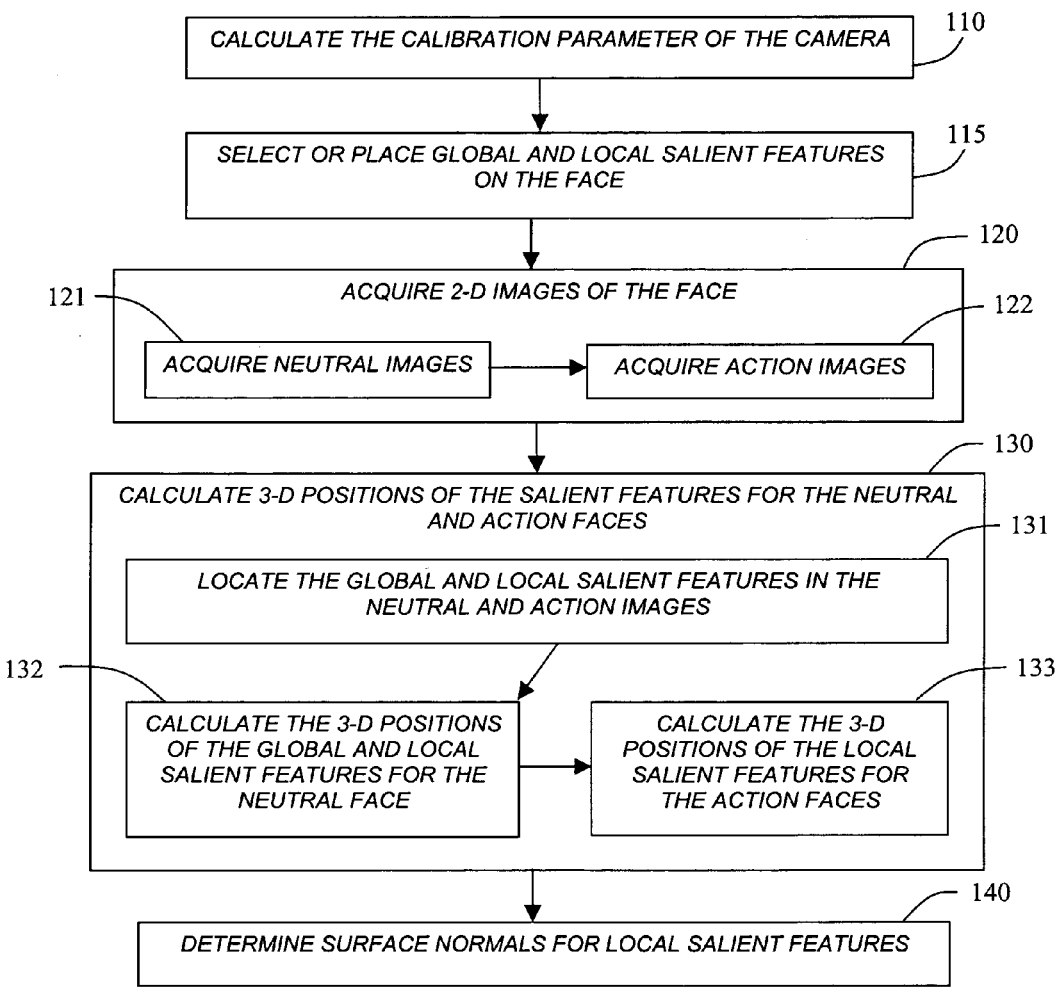
FIG. 2 is a first flowchart for the method of the present invention.
Figure 3:
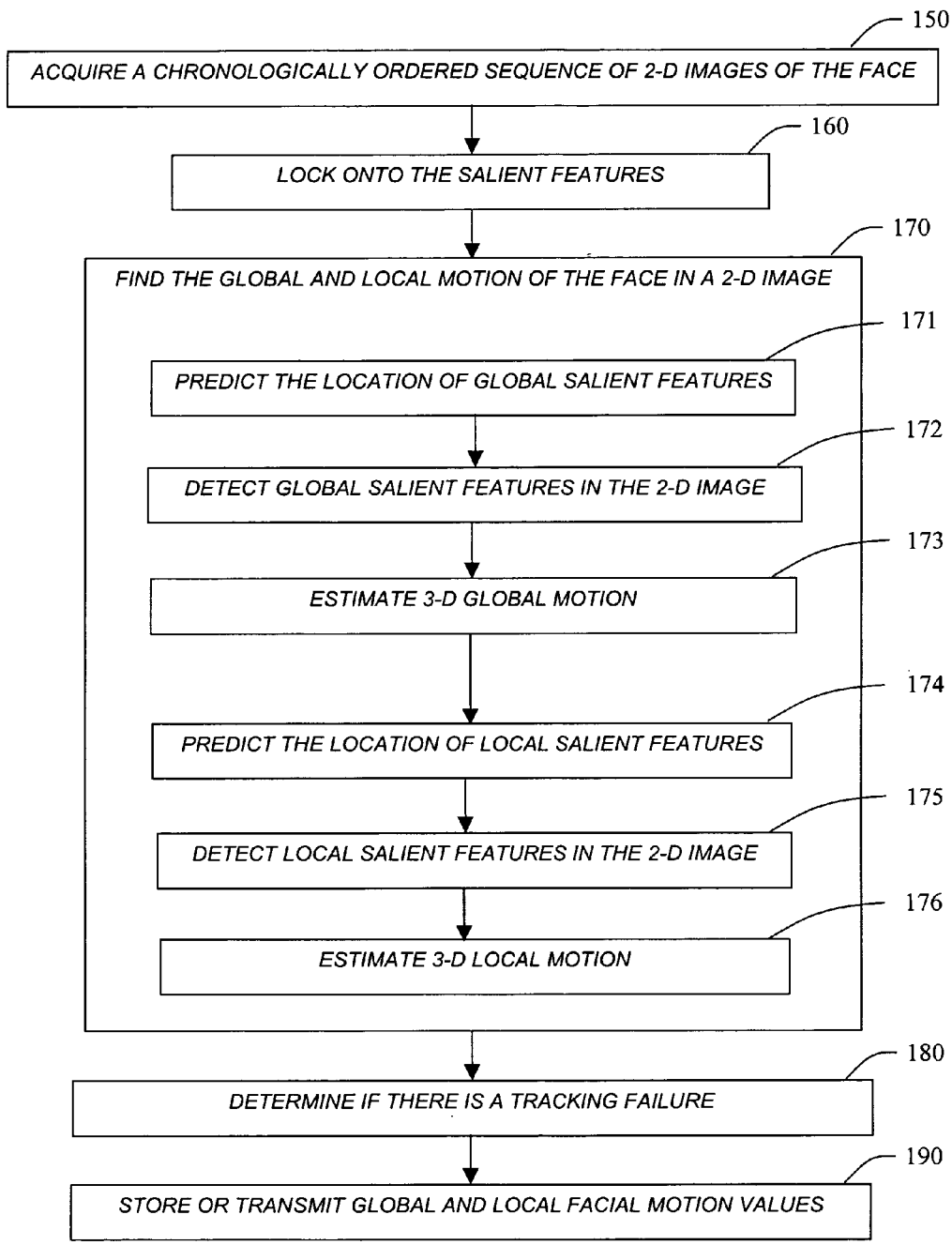
FIG. 3 is a second flowchart for the method of the present invention.

Referring to FIGS. 2 and 3, there are illustrated the ten steps of the present invention which are first succinctly outlined and later described in detail. The first five steps are the initialization steps of the invention. Briefly stated, the first five steps are as follows: (a) selecting or placing salient features on the person's face (Step 100); (b) calculating the calibration parameter of the camera (Step 110); (c) acquiring a plurality of images of the person's face using the camera (Step 120); (d) calculating the 3-D positions of the salient features (Step 130); and (e) determining the surface normals and motion planes for the salient features (Step 140). The second five steps are the tracking steps of the invention. Briefly stated, the second five steps are as follows: (f)

acquiring a chronologically ordered sequence of 2-D images of the person's face in action (Step 150); (g) locking onto the salient features (Step 160); (h) tracking the global and local motion of the face (Step 170); (i) determining tracking failure (Step 180); and (j) storing or transmitting the global and local motion values (Step 190).

A. Selecting or Placing Features on the Person's Face for Motion Tracking (Step 100)

Figure 4:
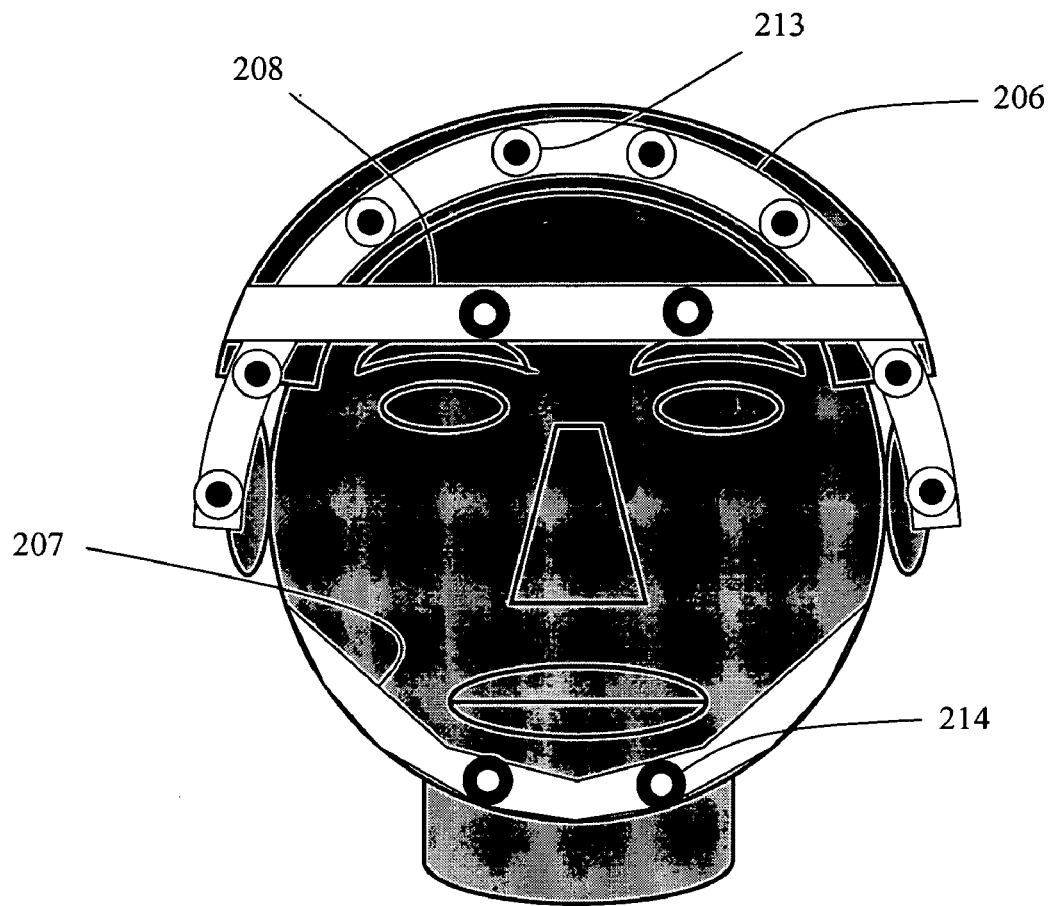
FIG. 4 is a diagram illustrating the method of placing markers on a person's face.

Referring to FIGS. 3 and 4, in the first step 100, salient features are selected or placed on the person's face for tracking the global and local motion of the face. Salient features that can be selected for tracking the global motion are the hairline, the corners of the eyes, the nostrils, and contours of the ears. Salient features that can be selected for tracking the local motion are the eyebrows, eyelids, pupils, and the lips. Methods have been proposed in the prior art for using the aforementioned salient features to track the global and local motion of the face. In a preferred embodiment of the present invention, salient features are designed and placed on the face rather than selected from what is naturally available on the face. It is important to note that placing salient features on the face allows for faster and more reliable motion tracking under adverse conditions for tracking, such as variations in illumination, poor video quality, and partial occlusion of the features.

Referring the FIG. 4, in a first preferred embodiment of the invention, circular markers are placed on a head-set that is worn by the person. The head-set may comprise a strap 206 for the skull, a strap 207 for the chin, and a strap 208 for the eyebrows. To achieve rotation invariance, two concentric circles are used to create the markers; one having twice the diameter of the other one, and the small one placed on top of the larger one. To achieve the highest contrast, the circles are painted in black and white. Thus, in the preferred embodiment, two types of markers are used: black-on-white 213 and white-on-black 214 markers. Those skilled in the art understand that other markers may be used, including and not limited to fluorescent dyes and contrasting paints.

Figure 5:
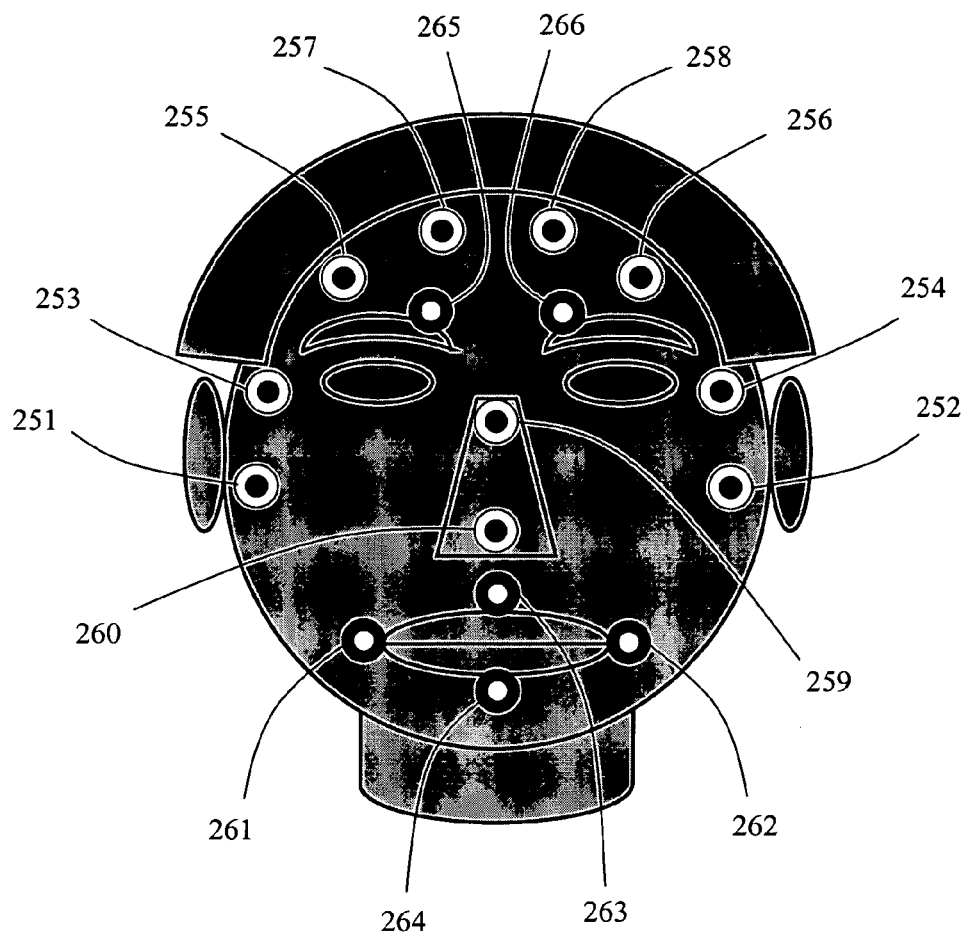
FIG. 5 is a diagram further illustrating the method of placing markers on a person's face.

Referring the FIG. 5, in a second preferred embodiment of the invention, circular markers are placed directly on the person's face. Markers are placed on the following ten locations on the person's face for tracking the global motion of the face; henceforth they are referred to as the global markers: right-ear-base 251, left-ear-base 252, right-temple 253, left-temple 254, right-outer-forehead 255, left-outer-forehead 256, right-central-forehead 257, left-central-forehead 258, node-base 259, and nose-tip 260. Markers are placed on the following six locations on the person's face for tracking the local motion of the face, henceforth they are referred to as the local markers: right-lip-corner 261, left-lip-corner 262, upper-lip-center 263, lower-lip-center 264, right-central-eyebrow 265, and left-central-eyebrow 266.

B. Calculating the Calibration Parameter of the Camera (Step 110)

Figures 6A, 6B:
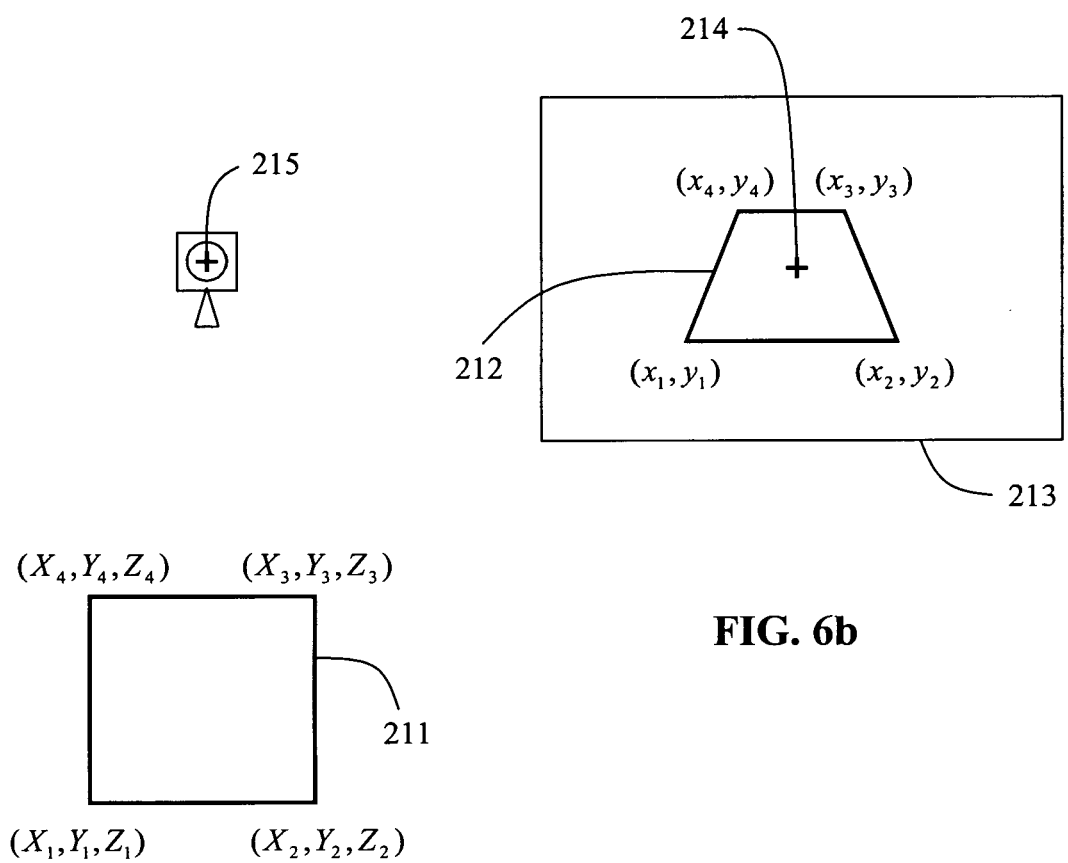
FIG. 6a is a diagram illustrating the method of calculating the calibration parameter of the camera with a target object.
FIG. 6b is a diagram illustrating the image of the target object captured by the camera.

Referring to FIGS. 6a and 6b, in the second step 110, a perspective image of a target object is captured with the camera with the target object being placed at approximately the same distance from the camera as the person's face. The method of the present invention uses the perspective image of the target object to calculate a camera parameter that is used in the subsequent steps, hereinafter referred to as the E parameter. It is instructive to note at this point that the E parameter has a non-negative value and it is a measure of the amount of perspective deformation caused by the camera. A zero value indicates no perspective deformation and the larger the value of the E parameter the more the perspective deformation caused by the camera.

Still referring to FIGS. 6a and 6b, in a preferred embodiment of the invention, a square-shaped object 211 is employed as the target object and the value of the E parameter of the camera is calculated as follows: First, the four corners of the quadrilateral 212 are either automatically detected or manually marked by a user on the image 213 of the object captured by the camera. Let $(x_n, y_n)$, n=1,2,3,4, represent 2-D the coordinates of the four corners of the object expressed in units of pixels with respect to the center 214 of the image 213. Letting $(X_n, Y_n, Z_n)$, n=1,2,3,4, represent the corresponding 3-D coordinates of the corners of the object in 3-D in units of meters with respect to the location 215 of the camera, the relationship between the 2-D and 3-D coordinates are mathematically expressed as follows:

$$x_n = \frac{X_n}{Z_n} FD,$$

$$y_n = \frac{Y_n}{Y_n} FD$$

where F denotes the focal length of camera in meters, and D denotes the meter to pixel conversion factor. For the purpose of present invention, it is necessary to find only the value of the product FD. In the present invention, we refer to the inverse of this product as the E parameter, hence in mathematical terms $$E = \frac{1}{FD}.$$

We also take advantage of the fact that the target object is square shaped and planar, hence letting $\alpha I$ denote the 3-D vector from $(X_1,Y_1,Z_1)$ to $(X_2,Y_2,Z_2)$ and $\alpha J$ denote the 3-D vector from $(X_1,Y_1,Z_1)$ to $(X_4,Y_4,Z_4)$, where I and J are orthonormal vectors and $\alpha$ is the size of the square, we have the following mathematical expressions for the 3-D positions of the corners of the square object:

$$(X_2,Y_2,Z_2)=(X_1,Y_1,Z_1)+\alpha I,$$

$$(X_3,Y_3,Z_3)=(X_1,Y_1,Z_1)+\alpha I+\alpha J,$$

$$(X_4,Y_4,Z_4)=(X_1,Y_1,Z_1)+\alpha J.$$

It is well known to anyone having knowledge in the field of 3-D geometry that the pair of 3-D orthonormal vectors (I,J) are specified uniquely with 3 real numbers. Thus, on the right hand side of the above equation set there is a total of 7 unknown real numbers defining the square object: 3 in (I,J), 3 in $(X_1,Y_1,Z_1)$, and the size of the square $\alpha$. Hence, including the E parameter, the following set of equations $$x_n = \frac{1}{E} \frac{X_n}{Z_n},$$

$$y_n = \frac{1}{E} \frac{Y_n}{Z_n},$$

has a total of 8 unknown real numbers on the right hand side, and 8 measured quantities, namely $(x_n, y_n)$, n=1,2,3,4, on the left hand side, resulting in a unique solution for the unknown real numbers in terms of the measured quantities. It is well known to anyone knowledgeable in the field of algebra how to obtain the value of the E parameter from the above equation set given only the measured quantities $(x_n, y_n)$, n=1,2,3,4.

C. Acquiring a Plurality of Images of a Person's Face Using the Camera (Step 120)

Referring to FIG. 2, the method of acquiring a plurality of images of a person's face using the camera comprises the steps of (1) acquiring neutral images of the face (Step 121); and (2) acquiring action images of the face (Step 122). In the following, a detailed description of these steps is given.

C1. Acquiring Neutral Images of the Face (Step 121)

Figure 7:
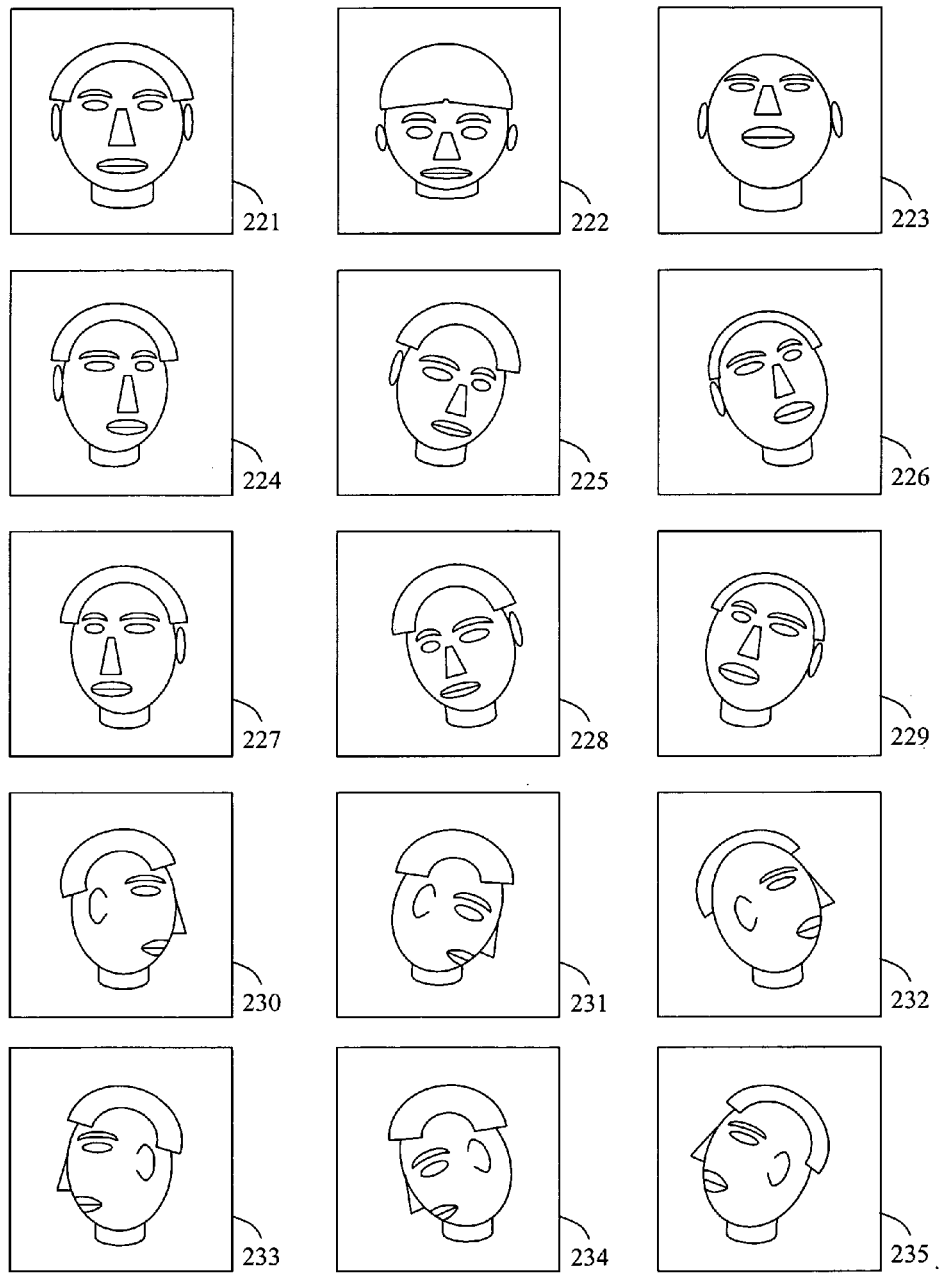
FIG. 7 is a diagram illustrating the method of acquiring a plurality of neutral images of a person's face using the camera.

Referring to FIGS. 2 and 7, in the third step 120, a plurality of 2-D images of the person's face in the same neutral state are captured with the camera from different directions. The neutral state for the face means that all face muscles are relaxed, eyes are normally open, mouth is closed and lips are in contact. These images are subsequently used to obtain the neutral 3-D positions of the salient features of the face, hence, hereinafter they are referred to as the neutral images. The camera directions to capture neutral images are selected so that the majority of salient features are visible in all images. The face is not required to be at the same distance from the camera in all the neutral images.

Still referring to FIG. 7, in a preferred embodiment of the present invention, markers are placed on the person's face as described in Step 100, and fifteen camera directions selected for obtaining the neutral images. In order to obtain the neutral images, the camera remains fixed and the person rotates his/her head to realize the following fifteen different directions: front 221, forehead 222, chin 223, angled-right 224, angled-right-tilted-down 225, angled-right-tilted-up 226, angled-left 227, angled-left-tilted-down 228, angled-left-tilted-up 229, full-right-profile 230, full-right-profile-tilted-down 231, full-right-profile-tilted-up 232, full-left-profile 233, full-left-profile-tilted-down 234, and full-left-profile-tilted-up 235.

C2. Acquiring Action Images of the Face (Step 122)

Referring to FIGS. 2 and 8, in the third step 120, a plurality of 2-D images of the person's face in action states are captured with the camera from different directions. The action states for the face include faces with a smiling mouth, a yawning mouth, raised eyebrows, etc. These images are subsequently used to obtain the 3-D position of the local salient features when the face is in action states, hence, hereinafter they are referred to as the action images. The camera directions to capture the action images are selected so that the majority of salient features are visible in all images. The face is not required to be at the same distance from the camera in all the action images.

Still referring to FIG. 8, in a preferred embodiment of the present invention, markers are placed on the person's face as described in Step 100 and five facial action states and two camera directions for each action are selected. The facial action states are as follows: smiling mouth, yawning mouth, kissing mouth, raised eyebrows, and squeezed eyebrows. The camera directions are front and right. In order to obtain the action images, the camera remains fixed and the person rotates his/her head while his/her face assumes an action state to capture the following ten different images: front-yawning-mouth 241, right-angled-yawning-mouth 242, front-smiling-mouth 243, right-angled-smiling-mouth 244, front-kissing-mouth 245, right-angled-kissing-mouth 246, front-raised-eyebrows 247, right-angled-raised-eyebrows 248, front-squeezed-eyebrows-249, right-angled-squeezed-eyebrows 250.

D. Calculating the Neutral 3-D Positions of the Salient Features (Step 130)

Referring to FIG. 2, the method calculating the neutral 3-D positions of the salient features comprises the steps of (1) locating the global and local salient features in the neutral and action images (Step 131); (2) calculating the 3-D positions of the global and local salient features for the neutral face (Step 132); and (3) calculating the 3-D positions of the local salient features for the action faces (Step 133). In the following, a detailed description of these steps is given.

D1. Locating the Global and Local Salient Features in the Neutral and Action Images (Step 131)

The salient features are automatically or manually located on the acquired images. It is important to note that not all of the salient features may be visible in all neutral and action images and some salient features may not be in their neutral position in some action images. Thus, in the present invention, the location of only the visible salient features and salient features that are in their neutral position are automatically or manually located in each neutral and action image.

In a preferred embodiment of the invention, markers that are placed on the face are used as the salient features as described in Step 100. These markers are manually located in the neutral images that are indicated with an X in the table in FIG. 9, and are manually located in action images that are indicated with an X in FIG. 10. The markers are assumed as invisible in those neutral images that are not indicated with an X in the table in FIG. 9. The markers are not in their neutral position in those action images that are not indicated with an X in the table in FIG. 10. In operation, the computer program prompts the user to manually locate only the visible markers and markers that are in their neutral position in each image.

D2. Calculating the 3-D Positions of the Global and Local Salient Features for the Neutral Face (Step 132)

Given the 2-D locations of the salient features in the neutral images where they are visible, and the value of the E parameter of the camera obtained in Step 110, the 3-D positions of the salient features of the person's face are calculated using a modified version of the method in "Shape and Motion from Image Streams under Orthography: A Factorization Method" by Carlo Tomasi and Takeo Kanade, *International Journal of Computer Vision*, vol. 9, no. 2, pp. 137–154, 1992. In a preferred embodiment of the present invention, global and local markers placed on the person's face as described in Step 100 are used as the salient features. In the following, first, a general mathematical analysis of 2-D image projections of 3-D marker positions is given. Next, the method of "Shape and Motion from Image Streams under Orthography" is reviewed. Then, the proposed modification to the method of "Factorization of Shape and Motion" is presented.

Without loss of generality, assume that the coordinate axes of the camera system are the unit vectors $\hat{\imath}=(1,0,0)$, $\hat{\jmath}=(0,1,0)$, and $\hat{k}=(0,0,1)$. Hence, the image plane passes at $(0,0,-F)$ and is perpendicular to $\hat{k}$. Let N denote the number of global markers and $P_n$, $n=1, \ldots, N$, denote the coordinates of the global markers with respect to the origin $(0,0,0)$ of the camera system. Likewise, let M denote the number of local markers and $Q_n$, $n=1, \ldots, M$, denote the coordinates of the local markers with respect to the origin $(0,0,0)$ of the camera system. Clearly, as the person's face is moved, the coordinates, of all the markers are changed. It is therefore more appropriate to use a local coordinate system for the face to represent the coordinates of the markers. Let the unit vectors $\tilde{\imath}$, $\tilde{\jmath}$, and $\tilde{k}$ denote the coordinate axes for an arbitrary local coordinate system for the face. The origin $C_0$ of the local coordinate system is defined to be the centroid of the markers and is given by $$C_0 = \frac{1}{N+M}\left(\sum_{n=1}^{N} P_n + \sum_{n=1}^{M} Q_n\right).$$

Furthermore, let $A_n$, $n=1, \ldots, N$, denote the coordinates of the global markers and let $B_n$, $n=1, \ldots, M$, denote the coordinates of the local markers with respect to the origin of the local coordinate system. Thus, as the person's face is moved, the origin of the local coordinate system is changed but the local coordinates of the markers always remain fixed.

In order to relate the global coordinates $P_n$, $n=1, \ldots, N$, and $Q_n$, $n=1, \ldots, M$, to the local coordinates $A_n$, $n=1, \ldots, N$, and $B_n$, $n=1, \ldots, M$, define the unit vectors $\hat{I}=I=(\hat{\imath}_x,\hat{\jmath}_x,\hat{k}_x)$, $\hat{J}=(\hat{\imath}_y,\hat{\jmath}_y,\hat{k}_y)$, and $\hat{K}=(\hat{\imath}_z,\hat{\jmath}_z,\hat{k}_z)$, where the subscripts x, y, and z, denote the coordinates of the respective vectors along the axes $\hat{\imath}$, $\hat{\jmath}$, and $\hat{k}$ of the global coordinate system. Then, the relationship between the global coordinates and the local coordinates of the feature points is given by $$P_{n,x}=C_{0,x}+A_n\cdot\hat{I}, Q_{n,x}=C_{0,x}+B_n\cdot\hat{I}$$

$$P_{n,y}=C_{0,y}+A_n\cdot\hat{J}, Q_{n,y}=C_{0,y}+B_n\cdot\hat{J} \text{ and}$$

$$P_{n,z}=C_{0,z}+A_n\cdot\hat{K}, Q_{n,z}=C_{0,z}+B_n\cdot\hat{K}$$

where · denotes the inner product of two vectors. Finally, the 2-D coordinates of the feature points projected on the image plane are expressed as $$p_{n,x} = \frac{1}{E}\frac{C_{0,x}+A_n\cdot\hat{I}}{C_{0,z}+A_n\cdot\hat{K}}, \quad q_{n,x} = \frac{1}{E}\frac{C_{0,x}+B_n\cdot\hat{I}}{C_{0,z}+B_n\cdot\hat{K}} \text{ and}$$

$$p_{n,y} = \frac{1}{E}\frac{C_{0,y}+A_n\cdot\hat{J}}{C_{0,z}+A_n\cdot\hat{K}}, \quad q_{n,y} = \frac{1}{E}\frac{C_{0,y}+B_n\cdot\hat{J}}{C_{0,z}+B_n\cdot\hat{K}},$$

where the quantities on the left hand side are in units of pixels while the quantities of the right hand side, except the E parameter and the unit vectors, are in units of meters. The above equations can be rewritten with all quantities in units of pixels as follows:

$$p_{n,x} = \frac{c_{0,x}+S_n\cdot\hat{I}}{\lambda+ES_n\cdot\hat{K}}, \quad q_{n,x} = \frac{c_{0,x}+L_n\cdot\hat{I}}{\lambda+EL_n\cdot\hat{K}} \text{ and}$$

$$p_{n,y} = \frac{c_{0,y}+S_n\cdot\hat{J}}{\lambda+ES_n\cdot\hat{K}}, \quad q_{n,y} = \frac{c_{0,y}+L_n\cdot\hat{J}}{\lambda+EL_n\cdot\hat{K}}$$

where $$c_{0,x} = \frac{C_{0,x}}{EW}, c_{0,y} = \frac{C_{0,y}}{EW}, \lambda = \frac{C_{0,z}}{W}, S_n = \frac{A_n}{EW}, \text{ and } L_n = \frac{B_n}{EW},$$

where W is some constant in units of meters that will be defined shortly.

It is now time to write the above equations for all neutral images. Suppose the number of neutral images is F, then the general equations for 2-D projections of markers are $$p_{n,x}^f = \frac{c_{0,x}^f+S_n\cdot\hat{I}^f}{\lambda^f+ES_n\cdot\hat{K}^f}, \quad q_{n,x}^f = \frac{c_{0,x}^f+L_n\cdot\hat{I}^f}{\lambda^f+EL_n\cdot\hat{K}^f} \text{ and}$$

$$p_{n,y}^f = \frac{c_{0,y}^f+S_n\cdot\hat{J}^f}{\lambda^f+ES_n\cdot\hat{K}^f}, \quad q_{n,y}^f = \frac{c_{0,y}^f+L_n\cdot\hat{J}^f}{\lambda^f+EL_n\cdot\hat{K}^f},$$

where $f=1, \ldots, F$, denotes the image number. Note that all quantities in the above equations vary with the image number, except for the local coordinates of the markers and of course the E parameter. The parameter W has the same value for all $f=1, \ldots, F$, otherwise its value is arbitrary.

The method of "Shape and Motion from Image Streams under Orthography" assumes a special form of 2-D projection, namely, the orthographic projection. In orthographic projection, it is assumed that $C_{0,z}$ is the same for all images, $W=C_{0,z}$, and $W \gg 1$. Thus, the above general equations reduce to the following form in the case of orthographic projections:

$$p_{n,x}^f=c_{0,x}^f+S_n\cdot\hat{I}^f, q_{n,x}^f=c_{0,x}^f+B_n\cdot\hat{I}^f \text{ and}$$

$$p_{n,y}^f=c_{0,y}^f+S_n\cdot\hat{J}^f, q_{n,y}^f=c_{0,y}^f+B_n\cdot\hat{J}^f.$$

The quantities on the left hand side are measured quantities while the quantities on the right hand side are unknown quantities. The method of "Factorization of Shape and Motion" solves the above equations for the 3-D local coordinates $S_n$ and $L_n$ of the global and local markers, respectively, the orientation vectors $\hat{I}^f$ and $\hat{J}^f$, and the 2-D position $(c_{0,x}^f,c_{0,y}^f)$ of the centroid of the markers in all images in terms of the 2-D projected positions $(p_{n,x}^f,p_{n,y}^f)$ and $(q_{n,x}^f,q_{n,y}^f)$ of the global and local markers, respectively, in all images.

In the following, a modification to the method of "Shape and Motion from Image Streams under Orthography" is presented in order to solve the general 2-D projection equations given above for the 3-D local coordinates $S_n$ and $L_n$ of the markers, the orientation vectors $\hat{I}^f$ and $\hat{J}^f$, the 2-D position $(c_{0,x}^f,c_{0,y}^f)$ of the centroid of the markers, and the distance ratio $\lambda^f$ in all images in terms of the 2-D projected positions $(p_{n,x}^f,p_{n,y}^f)$ and $(q_{n,x}^f,q_{n,y}^f)$ of the markers in all images. Note that the third orientation vector $\hat{K}^f$ is uniquely defined by the first two orientation vectors $\hat{I}^f$ and $\hat{J}^f$ simply as $$\hat{K}^f=\hat{I}^f\times\hat{J}^f,$$

where × denotes the vector outer product. The proposed modification method is an iterative procedure whose steps are as given below:

1. Use the method of "Shape and Motion from Image Streams under Orthography" that employs the orthographic projection equations to calculate $S_n$ for n=1, . . . ,N, $L_n$ for n=1, . . . ,M, $\hat{I}^f$, $\hat{J}^f$ and ($c^f_{0,x}, c^f_{0,y}$) for f=1, . . . ,F, given the 2-D measurements ($p^f_{n,x}, p^f_{n,y}$), ($q^f_{n,x}, q^f_{n,y}$) and the visibility information of the markers. Let $\hat{K}^f = \hat{I}^f \times \hat{J}^f$.

2. Calculate $\lambda^f$ for f=1, . . . ,F, using the general projection equations as $$\lambda^f = \frac{1}{\sum_{n=1}^{N}\|(p^f_{n,x}, p^f_{n,y})\| + \sum_{n=1}^{M}\|(q^f_{n,x}, q^f_{n,y})\|} \cdot$$

$$\left(\sum_{n=1}^{N}(\|(c^f_{0,x}+S_n\cdot\hat{I}^f, c^f_{0,y}+S_n\cdot\hat{J}^f)\| - \|(p^f_{n,x}, p^f_{n,y})\|ES_n\cdot\hat{K}^f) + \right.$$

$$\left.\sum_{n=1}^{M}(\|(c^f_{0,x}+L_n\cdot\hat{I}^f, c^f_{0,y}+L_n\cdot\hat{J}^f)\| - \|(q^f_{n,x}, q^f_{n,y})\|EL_n\cdot\hat{K}^f)\right)$$

3. Modify the 2-D measurements ($p^f_{n,x}, p^f_{n,y}$), n=1, . . . ,N, and ($q^f_{n,x}, q^f_{n,y}$), n=1, . . . ,M, for f=1, . . . ,F, using the calculated values in Steps 1 and 2 as $p^f_{n,x} \leftarrow p^f_{n,x}(\lambda^f + ES_n \cdot \hat{K}^f), q^f_{n,x} \leftarrow q^f_{n,x}(\lambda^f + EL_n \cdot \hat{K}^f)$ and $p^f_{n,y} \leftarrow p^f_{n,y}(\lambda^f + ES_n \cdot \hat{K}^f), q^f_{n,y} \leftarrow q^f_{n,y}(\lambda^f + EL_n \cdot \hat{K}^f).$ 4. Repeat Steps 1, 2, and 3 until a predetermined number of iterations has been reached, or the following average measurement of matching error $$\varepsilon = \frac{1}{V}\left(\sum_{f=1}^{F}\left(\sum_{n=1}^{N}\left\|\left(p^f_{n,x} - \frac{c^f_{0,x}+S_n\cdot\hat{I}^f}{\lambda^f+ES_n\cdot\hat{K}^f}, p^f_{n,y} - \frac{c^f_{0,y}+S_n\cdot\hat{J}^f}{\lambda^f+ES_n\cdot\hat{K}^f}\right)\right\|^2\right) + \right.$$

$$\left.\sum_{n=1}^{M}\left\|\left(q^f_{n,x} - \frac{c^f_{0,x}+L_n\cdot\hat{I}^f}{\lambda^f+EL_n\cdot\hat{K}^f}, q^f_{n,y} - \frac{c^f_{0,y}+L_n\cdot\hat{J}^f}{\lambda^f+EL_n\cdot\hat{K}^f}\right)\right\|^2\right)\right)^{\frac{1}{2}}$$

goes below a predetermined threshold, where the summation is only over the visible markers in each image, the quantity V denotes the total number of visible markers in all images, and ($p^f_{n,x}, p^f_{n,y}$) an ($q^f_{n,x}, q^f_{n,y}$) are the original 2-D measurements. In a preferred embodiment of the invention, the number of iterations is selected to be 50 and the threshold is selected to be 1 pixel.

The 3-D positions $S_n$, n=1, . . . ,N, and $L_n$, n=1, . . . ,M, of the global and local markers are globally translated and rotated so that they correspond to a frontal-looking face. In a preferred embodiment of the invention, the 3-D positions of the global markers right-ear-base 251, left-ear-base 252, nose-base 259, and nose-tip 260 are used to globally translate and rotate the the 3-D positions of the global and local markers so that they correspond to a frontal-looking face. Let $r_1$ and $r_2$ denote the 3-D positions of the right-ear-base 251 and left-ear-base 252, respectively; f denote the 3-D position of the nose-base 259; and b denote the 3-D position of the nose-tip 260. Then, the following procedure is used to globally translate the positions of the markers:

1. Define the following vector $$c = \frac{1}{2}(r_1 + r_2).$$

2. Subtract c from each $S_n$ and $L_n$, i.e., $S_n \leftarrow S_n - c$ and $L_n \leftarrow L_n - c$ so that the center of the feature points is shifted to the mid-point of the right-ear-base 251 and the left-ear-base 252.

Following the global translation of the markers, in a preferred embodiment of the invention, the following procedure is used to globally rotate the marker positions so that they correspond to a frontal-looking face:

1. Define the following three vectors $$u = r_2 - r_1, v = f - b, \text{ and } w = f - \frac{1}{2}(r_1 + r_2).$$

2. Use the Gram-Schmidt orthonormalization procedure to convert the vectors u, v, and w into an orthonormal set of vectors. As a result, u simply will be normalized; only the component of v that is perpendicular to u will be retained and subsequently normalized; and only the component of w that is perpendicular to both u and the modified v will be retained and subsequently normalized.

3. Form the 3×3 rotation matrix T so that the columns of T consist of the orthonormalized vectors U, v, w, i.e., T=[uvw].

4. Finally, left-multiply each $S_n$ and $L_n$ with T, i.e., $S_n \leftarrow TS_n$ and $L_n \leftarrow TL_n$.

D3. Calculating the 3-D Positions of the Local Salient Features for the Action Faces (Step 133)

Given the 3-D positions of the salient features obtained in Step 132, the 2-D measurements of the salient features obtained in Step 131, and the value of the E parameter of the camera obtained in Step 110, the method of calculating the 3-D positions of the local salient features for the action faces is disclosed in the following. In a preferred embodiment of the present invention, global and local markers placed on the person's face as described in Step 100 are used as the salient features. First, the position and orientation of the person's face in the action images are calculated using the 3-D positions $S_n$ of the global markers and the 2-D measurements ($p^f_{n,x}, p^f_{n,y}$) of the global markers in the action images. Then, the 3-D positions $L_n^{(i)}$ of the local markers in the action states are calculated using the position and orientation of the person's face in the action images and the 2-D measurements ($q^f_{n,x}, q^f_{n,y}$) of the local markers in the action images.

It facilitates understanding to note that the 3-D position of the face in an image f is described by the centroid ($c^f_{0,x}, c^f_{0,y}$) of the markers and the camera-distance-ratio $\lambda^f$ of the face in that image. Likewise, the 3-D orientation of the face in an image f is described by the vectors $\hat{I}^f$ and $\hat{J}^f$ in that image. The 3-D position and orientation parameters ($c^f_{0,x}, c^f_{0,y}$), $\lambda^f$, $\hat{I}^f$ and $\hat{J}^f$ in the action images are calculated using the following steps:

1. Use the motion-only-estimation method of "Factorization of Shape and Motion" that employs the orthographic projection equations to calculate $\hat{I}^f$, $\hat{J}^f$ and $(c^f_{0,x}, c^f_{0,y})$ in the action images given the 2-D measurements $(p^f_{n,x}, p^f_{n,y})$ and the visibility information of the global markers in the action images, and the 3-D positions $S_n$ of the markers calculated in Step 132. Let $\hat{K}^f = \hat{I}^f \times \hat{J}^f$.

2. Calculate $\lambda^f$ using the general projection equations as $$\lambda^f = \frac{1}{\sum_{n=1}^{N}\|(p^f_{n,x}, p^f_{n,y})\|} \sum_{n=1}^{N} (\|(c^f_{0,x} + S_n \cdot \hat{I}^f, c^f_{0,y} + S_n \cdot \hat{J}^f)\| -$$

$$\|(p^f_{n,x}, p^f_{n,y})\| ES_n \cdot \hat{K}^f)$$

3. Modify the 2-D measurements $(p^f_{n,x}, p^f_{n,y})$ for n= 1, . . . ,N, using the calculated values in Step 1 and 2 as $p^f_{n,x} \leftarrow p^f_{n,x}(\lambda^f + ES_n \cdot \hat{K}^f)$, and $p^f_{n,y} \leftarrow p^f_{n,y}(\lambda^f + ES_n \cdot \hat{K}^f)$.

4. Repeat Steps 1, 2, and 3 until a predetermined number of iterations has been reached, or the following average measurement of matching error $$\varepsilon^f = \left(\frac{1}{U}\sum_{n=1}^{N}\left\|\left(p^f_{n,x} - \frac{c^f_{0,x} + S_n \cdot \hat{I}^f}{\lambda^f + ES_n \cdot \hat{K}}, p^f_{n,x} - \frac{c^f_{0,x} + S_n \cdot \hat{J}^f}{\lambda^f + ES_n \cdot \hat{K}}\right)\right\|^2\right)^{\frac{1}{2}}$$

for the image goes below a predetermined threshold, where the summation is only over the visible points in the image, the quantity U denotes the total number of visible points in the image, and $(p^f_{n,x}, p^f_{n,y})$ are the original 2-D measurements. In a preferred embodiment of the invention, the number of iterations is selected to be 50 and the threshold is selected to be 1 pixel.

The 3-D positions $L_n$ of the local markers for the action faces are then calculated using the following steps:

1. Use the shape-only-estimation method of "Factorization of Shape and Motion" that employs the orthographic projection equations to calculate the 3-D positions $L_n^{(i)}$ of the local markers in action state i given the position $(c^f_{0,x}, c^f_{0,y})$ and orientation $\hat{I}^f$, $\hat{J}^f$ of the face, the measurements $(q^f_{n,x}, q^f_{n,y})$, and the visibility information of the local markers in the 2-D 10 images of the action state i. Referring to FIG. 8, in a preferred embodiment of the invention, there are 5 action states where action state i=1 corresponds to a yawning mouth 241 and 242, action state i=2 corresponds to a smiling mouth 243 and 244, action state i=3 corresponds to a kissing mouth 245 and 246, action state i=4 corresponds to raised eyebrows 247 and 248, and action state i=5 corresponds to squeezed eyebrows 249 and 250.

2. Modify the 2-D measurements $(q^f_{n,x}, q^f_{n,y})$ for n= 1, . . . ,M, and for each action state i, using the calculated values in Step 1 as $q^f_{n,x} \leftarrow q^f_{n,x}(\lambda^f + EL_n^{(i)} \cdot \hat{K}^f)$, and $q^f_{n,y} \leftarrow q^f_{n,y}(\lambda^f + EL_n^{(i)} \cdot \hat{K}^f)$.

3. Repeat Steps 1 and 2 until a predetermined number of iterations has been reached, or the following average measurement of matching error $$\varepsilon^f = \left(\frac{1}{U}\sum_{n=1}^{M}\left\|\left(q^f_{n,x} - \frac{c^f_{0,x} + L_n^{(i)} \cdot \hat{I}^f}{\lambda^f + EL_n^{(i)} \cdot \hat{K}}, q^f_{n,x} - \frac{c^f_{0,y} + L_n^{(i)} \cdot \hat{J}^f}{\lambda^f + EL_n^{(i)} \cdot \hat{K}}\right)\right\|^2\right)^{\frac{1}{2}}$$

for the image goes below a predetermined threshold, where the summation is only over the visible points in the image, the quantity U denotes the total number of visible points in the image, and $(q^f_{n,x}, q^f_{n,y})$ are the original 2-D measurements. In a preferred embodiment of the invention, the number of iterations is selected to be 50 and the threshold is selected to be 1 pixel.

E. Determining the Surface Normals and Motion Planes for the Salient Features (Step 140)

Referring to FIG. 2, in the fifth step, a surface normal is defined for each marker. The surface normals are used during the tracking process to determine if a marker is visible in a 2-D image. The surface normal for a marker is defined to be the vector perpendicular to the surface of the face at the location of the marker. In a preferred embodiment of the invention, the vectors given in the table in FIG. 11 are defined as the surface normals for the global markers. The surface normals for local markers are given in FIG. 12. It should be noted that the surface normals given in the tables in FIGS. 11 and 12 are not necessarily normalized. They can be normalized to so that they all have unit length. The normalized surface normals for the global and local markers are denoted by $\Omega_n$ for n=1, . . . ,N, and $\Psi_n$ for n=1, . . . ,M, respectively. The surface normals for the markers are used later in Step 170 to determine the visibilities of the markers in a 2-D image.

F. Receiving a Chronologically Ordered Sequence of 2-D Images of the Person's Face in Action (Step 150)

Referring to FIG. 3, in the sixth step 150, a video of the face of the person in action is received. The 2-D images of the video are processed to track the salient features on the face and to calculate the global and local motion of the face in the order they are received.

G. Locking onto the Selected Features on the Person's Face (Step 160)

Referring to FIG. 3, in the seventh step 160, a locking method is used to start tracking the salient features of the face. The locking method is used at the very beginning of the tracking process or whenever the tracking is lost, as described in Step 190. initial images of the video are used to lock the tracking process onto the salient features on the face.

In a preferred embodiment of the invention, cross-like signs are displayed on top of the 2-D image to be associated with the markers on the face. The locations of the signs are determined by projecting the 3-D positions of the markers obtained in Step 132 assuming a frontal orientation of the face. To achieve locking, the person looks directly at the camera so as to produce a frontal view positioned at the center of the image. The person moves his/her face back and

13 forth and also rotates his/her face if necessary until all the markers on his/her face are positioned at approximately the same location as the associated signs on the display. The method of the present invention considers the locations of the cross-like signs as the predicted locations for the features and uses the method of Step 173 to calculate the current motion in the 2-D image. If the calculated motion corresponds to a frontal orientation at the center of the display, then the method of the present invention considers a lock onto the features has been achieved.

H. Tracking the 3-D Global and Local Motion of the Face in Each 2-D Image (Step 170)

Referring to FIG. 4, the method finding the 3-D global and local motion of the face in each 2-D image comprises the steps of (1) predicting the global motion (Step 171); (2) detecting the global salient features (Step 172); (3) estimating the global motion (Step 173); (4) predicting the local motion (Step 174); (5) detecting the local salient features (Step 175); and (6) estimating the local motion (Step 176). In the following, a detailed description of these steps is given.

H1. Predicting the Locations of Global Salient Features (Step 171)

The global motion of the face in a 2-D image is defined to be the 3-D orientation and position of the face in the 2-D image. Referring to FIG. 4, in the eighth step, the global motion of the face in a 2-D image that is currently processed is predicted from the motion of the face in the previously processed 2-D images. In a preferred embodiment of the invention, the calculated position and orientation of the face in the immediate previous 2-D image is used as the prediction for the global motion in the current 2-D image. Thus, the predicted locations $(\tilde{p}_{n,x}, \tilde{p}_{n,y})$ for $n=1, \ldots, N$, of the global markers in the current 2-D image are calculated using $$\tilde{p}_{n,x} = \frac{\tilde{c}_{0,x} + S_n \cdot \tilde{I}}{\tilde{\lambda} + ES_n \cdot \tilde{K}}, \quad \tilde{p}_{n,y} = \frac{\tilde{c}_{0,y} + S_n \cdot \tilde{J}}{\tilde{\lambda} + ES_n \cdot \tilde{K}},$$

where, $$(\tilde{c}_{0,x}, \tilde{c}_{0,y}), \tilde{\lambda}, \tilde{I} \text{ and } \tilde{J}$$

denote the global motion parameters found in the previous 2-D image, and $$\tilde{K} = \tilde{I} \times \tilde{J}.$$

H2. Detecting the Global Salient Features (Step 172)

The method of detecting the global markers in the current 2-D image is comprised of the following steps:
1. Determine the visibility indices of the global markers: Calculate the visibility index $\omega_n$ for each global marker:

$$\omega_n = \tilde{K} \cdot \Omega_n.$$

It is important to note that the closer the value of the index $\omega_n$ to 1, the more visible is the global marker.

14

2. Design correlation filters for detecting the markers: It is important to note that the two concentric circles that form a global marker will appear like two concentric ellipses in the current 2-D image. The minor axis of the ellipse will be in the direction of the vector $$(\tilde{I} \cdot \Omega_n, \tilde{J} \cdot \Omega_n),$$

and the length of the minor axis will be $$|\tilde{K} \cdot \Omega_n| R \sigma_n$$

while the length of the major axis will be $R\sigma_n$, where R is the diameter of the outer circle in units of pixel and $\sigma_n$ is given by $$\sigma_n = \frac{1}{\tilde{\lambda} + ES_n \cdot \tilde{K}}.$$

Thus, in order to detect global marker n in the current 2-D image, a 2-D correlation filter is designed that has the support given by the outer ellipse and having the value of 1 inside the inner ellipse and the value of 0 elsewhere. Let the coefficients of the 2-D correlation filter for the global marker n be given by $c_n(x,y)$.

3. Detect the global markers: If the visibility index $\omega_n$ of global marker n is larger than a visibility threshold, then apply the correlation filter $c_n(x,y)$ designed in Step 2 for the global marker n in a W×W square region centered at the predicted location $(\tilde{p}_{n,x}, \tilde{p}_{n,y})$ of the global marker n to obtain a correlation surface $f_n(i,j)$ for the global marker n:

$$f_n(i,j) = \sum c_n(x,y) \cdot I(x+i+\tilde{p}_{n,x}, y+j+\tilde{p}_{n,y}), \quad -\frac{W}{2} < i, j < \frac{W}{2},$$

where the summation is over the support of the correlation filter $c_n(x,y)$ and $I(x,y)$ denotes the intensity distribution of the 2-D image with the center of the image being at (0,0). In a preferred embodiment of the invention, the visibility threshold is selected as 0.25 and the size W of the square region is selected as 20 pixels. Find the location $(i_n^*, j_n^*)$ where the correlation surface $f_n(i,j)$ achieves its peak value. Then, the image location $$(x_n, y_n) = (i_n^* + \tilde{p}_{n,x}, j_n^* + \tilde{p}_{n,y})$$

is assigned as the detected location of the global marker n in the current 2-D image. Let $Q_n$ denote this peak value.

4. Eliminate superfluous and multiple detected locations: If the distance between any two detected locations is less than a distance threshold, but larger than zero, then discard the detected location that has a smaller peak value. On the other hand, if the exact same location is detected for more than one global marker, then assign the detected location only to the global marker that has the largest visibility index. In a preferred embodiment of the invention, the distance threshold is selected to be 1 pixel. All global markers that are not assigned a valid detected location are assumed invisible for the purpose of estimating the global motion that is done in the following Step 173.

H3. Estimating the Global Motion (Step 173)

Suppose, at the end of Step 172, there are L valid detected locations assigned to L global markers. The 3-D orientation $\hat{I}$ and $\hat{J}$, and the 3-D position $(c_{0,x}, c_{0,y})$, $\lambda$, of the face in the current 2-D image are then calculated from these L detected locations using the following steps:

1. Use the motion-only-estimation method of "Factorization of Shape and Motion" that employs the orthographic projection equations to calculate $\hat{I}$, $\hat{J}$ and $(c_{0,x}, c_{0,y})$ given the 2-D locations $(x_n, y_n)$ and the visibility information of the global markers in the action images, and the 3-D positions $S_n$ of the markers calculated in Step 132. Let $\hat{K} = \hat{I} \times \hat{J}$.
2. Calculate $\lambda$ using the general projection equations as $$\lambda = \frac{1}{\sum_n \|(x_n, y_n)\|} \sum_n (\|(c_{0,x} + S_n \cdot \hat{I}, c_{0,y} + S_n \cdot \hat{J})\| - \|(x_n, y_n)\| ES_n \cdot \hat{K}),$$

where the summation is only over the visible global markers.
3. Modify the 2-D locations $(x_n, y_n)$ using the calculated values in Step 1 and 2 as $$x_n \leftarrow x_n (\lambda + ES_n \cdot \hat{K}), \text{ and}$$

$$y_n \leftarrow y_n (\lambda + ES_n \cdot \hat{K}).$$

4. Repeat Steps 1, 2, and 3 until a predetermined number of iterations has been reached, or the following average measurement of matching error $$\varepsilon = \left( \frac{1}{L} \sum_n \left\| \left( x_n - \frac{c_{0,x} + S_n \cdot \hat{I}}{\lambda + ES_n \cdot \hat{K}}, y_n - \frac{c_{0,y} + S_n \cdot \hat{J}}{\lambda + ES_n \cdot \hat{K}} \right) \right\|^2 \right)^{\frac{1}{2}}$$

goes below a predetermined threshold, where the summation is only over the visible global markers. In a preferred embodiment of the invention, the number of iterations is selected to be 50 and the threshold is selected to be 1 pixel.

H4. Predicting the Locations of Local Salient Features (Step 174)

The local motion of the face in a 2-D image is defined through an action vector that represents the actions of the face in the 2-D image. In a preferred embodiment of the invention there are a total of 5 actions, hence the action vector has 5 components:

$$A = (A_{MY}, A_{MS}, A_{MK}, A_{ER}, A_{ES})$$

$A_{MY}$ being the amount of yawning-mouth action, $A_{MS}$ being the amount of smiling-mouth action, $A_{MK}$ being the amount of kissing-mouth action, $A_{ER}$ being the amount of raised-eyebrows action, and $A_{ES}$ being the amount of squeezed-eyebrows action. For example, an action vector $A = (0.5, 0.0, 0.0, 1.0, 0.0)$ represents a half-yawning mouth and fully raised eyebrows.

As mentioned in Step 133, there are 5 action states. It facilitates understanding to give examples of action vectors for the action states. Action state $i=1$ that corresponds to a yawning mouth has action vector $A = (1.0, 0.0, 0.0, 0.0, 0.0)$ while action state $i=5$ that corresponds to squeezed eyebrows has action vector $A = (0.0, 0.0, 0.0, 0.0, 1.0)$. The neutral state of the face is represented by the action vector $A = (0.0, 0.0, 0.0, 0.0, 0.0)$.

During the locking process explained in Step 160, the face is in the neutral state, hence the action vector is given by $A = (0.0, 0.0, 0.0, 0.0, 0.0)$. In any subsequent 2-D image of the face, the action vector found for the previous image is used as the predicted action vector for the current image. Let $\tilde{A}$ denote the predicted action vector for the current image. Let $$\bar{L}_n = (L_n^{(1)} - L_n, L_n^{(2)} - L_n, L_n^{(3)} - L_n, L_n^{(4)} - L_n, L_n^{(5)} - L_n)$$

denote the action displacement vector for local marker n. Then, the predicted 3-D positions $\tilde{L}_n$ of the local markers in the current image are calculated as follows:

$$\tilde{L}_n = \tilde{A} \cdot \bar{L}_n + L_n.$$

Finally, the predicted 2-D locations $(\tilde{q}_{n,x}, \tilde{q}_{n,y})$ of the local markers in the current image are calculated using $$\tilde{q}_{n,x} = \frac{\tilde{c}_{0,x} + \tilde{L}_n \cdot \hat{I}}{\tilde{\lambda} + E\tilde{L}_n \cdot \hat{K}}, \quad \tilde{q}_{n,y} = \frac{\tilde{c}_{0,y} + \tilde{L}_n \cdot \hat{J}}{\tilde{\lambda} + E\tilde{L}_n \cdot \hat{K}},$$

where, $(\tilde{c}_{0,x}, \tilde{c}_{0,y})$, $\tilde{\lambda}$, $\hat{I}$ and $\hat{J}$ denote the global motion parameters found in the previous 2-D image, and $\hat{K} = \hat{I} \times \hat{J}$.

H5. Detecting the Local Salient Features (Step 175)

The method of detecting the global markers in the current 2-D image is comprised of the following steps:
1. Determine the visibility indices of the local markers: Calculate the visibility index $\psi_n$ for each local marker:

$$\psi_n = \hat{K} \cdot \Psi_n.$$

It is important to note that the closer the value of the index $\psi_n$ to 1, the more visible is the local marker.
2. Design correlation filters for detecting the markers: It is important to note that the two concentric circles that form a local marker will appear like two concentric ellipses in the current 2-D image. The minor axis of the ellipse will be in the direction of the vector $$(\tilde{I} \cdot \Psi_n, \tilde{J} \cdot \Psi_n),$$

and the length of the minor axis will be $$|\hat{K} \cdot \Psi_n| R \mu_n$$

while the length of the major axis will be $R\mu_n$, where R is the diameter of the outer circle in units of pixel and $\mu_n$ is given by $$\mu_n = \frac{1}{\tilde{\lambda} + E\tilde{L}_n \cdot \hat{K}}.$$

Thus, in order to detect local marker n in the current 2-D image, a 2-D correlation filter is designed that has the support given by the outer ellipse and having the value of 0 inside the inner ellipse, the value of 1 in the outer ellipse, and the value of 0 elsewhere. Let the coefficients of the 2-D correlation filter for the local marker n be given by $d_n(x,y)$.

3. Detect the local markers: If the visibility index $\psi_n$ of local marker n is larger than a visibility threshold, then apply the correlation filter $d_n(x,y)$ designed in Step 2 for local marker n in a W×W square region centered at the predicted location $(\tilde{q}_{n,x}, \tilde{q}_{n,y})$ of local marker n to obtain a correlation surface $h_n(i,j)$ for local marker n:

$$h_n(i,j) = \sum d_n(x,y) \cdot I(x+i+\tilde{q}_{n,x}, y+j+\tilde{q}_{n,y}), -\frac{W}{2} < i,j < \frac{W}{2},$$

where the summation is over the support of the correlation filter $d_n(x,y)$ and I(x,y) denotes the intensity distribution of the 2-D image with the center of the image being at (0,0). In a preferred embodiment of the invention, the visibility threshold is selected as 0.25 and the size W of the square region is selected as 20 pixels. Find the location $(i_n^*, j_n^*)$ where the correlation surface $h_n(i,j)$ achieves its peak value. Then, the image location $(u_n, v_n) = (i_n^* + \tilde{q}_{n,x}, j_n^* + \tilde{q}_{n,y})$ is assigned as the detected location of the global marker n in the current 2-D image. Let $Q_n$ denote this peak value.

4. Eliminate superfluous and multiple detected locations: If the distance between any two detected locations is less than a distance threshold, but larger than zero, then discard the detected location that has a smaller peak value. On the other hand, if the exact same location is detected for more than one local marker, then assign the detected location only to the local marker that has the largest visibility index. In a preferred embodiment of the invention, the distance threshold is selected to be 1 pixel. All local markers that are not assigned a valid detected location are assumed invisible for the purpose of estimating the local motion that is done in the following Step 176.

H6. Estimating the Local Motion (Step 176)

The local motion of the face is represented by an action vector as described in Step 174. In a first preferred embodiment of the invention, the action vector for the current image is calculated using the following steps:

1. Calculate the 2-D displacements of the local markers: The 2-D locations $(q_{n,x}, q_{n,y})$ of the local markers corresponding to the neutral face are calculated using the global motion found for the current image as:

$$q_{n,x} = \frac{\tilde{c}_{0,x} + L_n \cdot \hat{I}}{\tilde{\lambda} + EL_n \cdot \hat{K}}, \quad q_{n,y} = \frac{\tilde{c}_{0,y} + L_n \cdot \hat{J}}{\tilde{\lambda} + EL_n \cdot \hat{K}}.$$

The 2-D displacements $(d_{n,x}, d_{n,y})$ are then calculated as $$d_{n,x} = u_n - q_{n,x}, d_{n,y} = v_n - q_{n,y}.$$

2. Modify the 2-D displacements so that they correspond to orthographic projection:

$$d_{n,x} \leftarrow d_{n,x}(\lambda + EL_n \cdot \hat{K}), \text{ and}$$

$$d_{n,y} \leftarrow d_{n,y}(\lambda + EL_n \cdot \hat{K}).$$

3. Calculate the 3-D displacements of the local markers: The 3-D displacements of the local markers are calculated from the 2-D displacements of the local markers, the 2-D motion planes of the local markers, and the global motion of the face in the current image. The 2-D motion plane of a local marker passes from the neutral 3-D position of the local marker and approximates the motion space of local marker with a plane. Two basis vectors are used to define each motion plane. Let $B_{1,n}$ and $B_{2,n}$ denote the basis vectors 1 and 2 for the local marker n. The basis vectors for the motion planes of the local markers are given in FIG. 12. The 3-D displacements of the local markers are then calculated as follows. Form the matrix $M_n$ for each local marker $$M_n = \begin{bmatrix} B_{1,n} \cdot \hat{I} & B_{2,n} \cdot \hat{I} \\ B_{1,n} \cdot \hat{J} & B_{2,n} \cdot \hat{J} \end{bmatrix}$$

and solve for the coefficients $\alpha_{1,n}$ and $\alpha_{2,n}$ in $$\begin{bmatrix} d_{n,x} \\ d_{n,y} \end{bmatrix} = M_n \begin{bmatrix} \alpha_{1,n} \\ \alpha_{2,n} \end{bmatrix}.$$

Then, the 3-D displacements $U_n$ are given by $$U_n = \alpha_{1,n} \cdot B_{1,n} + \alpha_{2,n} \cdot B_{2,n}.$$

Once the 3-D moved positions of the markers are calculated they can be modified so as to satisfy the motion symmetries of the face. Examples of motion symmetries of the face are as follows: the right and the left eyebrows move simultaneously and by the same amount, and the right and the left corners of the mouth move simultaneously and by the same amount.

The calculated 3-D displacements of the markers can be further modified to enforce motion dependencies of the face. An example of a motion dependency of the face is as follows: as the corners of the mouth move towards the center of the mouth, the centers of the top and bottom lips move forward.

The calculated 3-D displacements of the markers can be still further modified by filtering. The filtering of the calculated 3-D displacements of the face smooth out the jitter in the calculated 3-D positions that can be caused by errors in the detected 2-D positions of the markers.

4. Finally, the action vector $(a_1, \ldots, a_M)$ for the current image is calculated by solving the following equation for $(a_1, \ldots, a_M)$ in the least-squares sense:

$$\begin{bmatrix} U_1 \\ \vdots \\ U_M \end{bmatrix} = \begin{bmatrix} \overline{L}_1 \\ \vdots \\ \overline{L}_M \end{bmatrix} \cdot \begin{bmatrix} a_1 \\ \vdots \\ a_M \end{bmatrix}.$$

In a second preferred embodiment of the invention, the action vector for the current image is calculated using the following steps:

1. Calculate the 2-D locations $(q_{n,x}, q_{n,y})$ of the local markers corresponding to the neutral face using the global motion found for the current image as:

$$q_{n,x} = \frac{\tilde{c}_{0,x} + L_n \cdot \hat{I}}{\tilde{\lambda} + EL_n \cdot \hat{K}}, \quad q_{n,y} = \frac{\tilde{c}_{0,y} + L_n \cdot \hat{J}}{\tilde{\lambda} + EL_n \cdot \hat{K}}.$$

Still referring to FIGS. 5 and 9, local marker n=1 corresponds to Right-lip-corner 261, n=2 corresponds to Left-lip-corner 262, n=3 corresponds to Upper-lip-center 263, n=4 corresponds to Lower-lip-center 264, n=5 corresponds to Right-central-eyebrow 265, and n=6 corresponds to Left-central-eyebrow 266.

Also calculate the 2-D location $(p_{9,x}, p_{9,y})$ of the global marker n=9 Nose-base 259 using the global motion found for the current image as:

$$p_{n,x} = \frac{\tilde{c}_{0,x} + S_n \cdot \hat{I}}{\tilde{\lambda} + ES_n \cdot \hat{K}}, \quad p_{n,y} = \frac{\tilde{c}_{0,y} + S_n \cdot \hat{J}}{\tilde{\lambda} + ES_n \cdot \hat{K}},$$

where n is set to 9 for the global marker Nose-base 259.

2. Calculate the 2-D locations $(q^{(i)}_{n,x}, q^{(i)}_{n,y})$ of the local markers corresponding to the action states of the face using the global motion found for the current image as:

$$q^{(i)}_{n,x} = \frac{\tilde{c}_{0,x} + L^{(i)}_n \cdot \hat{I}}{\tilde{\lambda} + EL^{(i)}_n \cdot \hat{K}}, \quad q^{(i)}_{n,y} = \frac{\tilde{c}_{0,y} + L^{(i)}_n \cdot \hat{J}}{\tilde{\lambda} + EL^{(i)}_n \cdot \hat{K}},$$

where i is the index of the facial action. Still referring to FIG. 8, in a preferred embodiment of the invention, there are 5 action states where action state i=1 corresponds to a yawning mouth 241 and 242, action state i=2 corresponds to a smiling mouth 243 and 244, action state i=3 corresponds to a kissing mouth 245 and 246, action state i=4 corresponds to raised eyebrows 247 and 248, and action state i=5 corresponds to squeezed eyebrows 249 and 250.

3. Determine the fractional displacements $f^{(1)}$, $f^{(2)}$, and $f^{(3)}$ for yawning-mouth, smiling-mouth, and kissing mouth actions, respectively, as follows. The fractional displacement $f^{(1)}$ is determined based on the distance between the Upper-lip-center 263 and Lower-lip-center 264 in the yawning-mouth action state i=1 of the face, and in the neutral state of the face, and the distance between the detected positions of those markers:

$$f^{(1)} = \frac{\left\| \begin{matrix} u_3 - u_4 \\ v_3 - v_4 \end{matrix} \right\| - \left\| \begin{matrix} q_{3,x} - q_{4,x} \\ q_{3,y} - q_{4,y} \end{matrix} \right\|}{\left\| \begin{matrix} q^{(1)}_{3,x} - q^{(1)}_{4,x} \\ q^{(1)}_{3,y} - q^{(1)}_{4,y} \end{matrix} \right\| - \left\| \begin{matrix} q_{3,x} - q_{4,x} \\ q_{3,y} - q_{4,y} \end{matrix} \right\|}.$$

The fractional displacement $f^{(2)}$ is determined based on the distance between the Right-lip-corner 261 and Left-lip-corner 262 in the smiling-mouth action state i=2 of the face, and in the neutral state of the face, and the distance between the detected positions of those markers:

$$f^{(2)} = \frac{\left\| \begin{matrix} u_1 - u_2 \\ v_1 - v_2 \end{matrix} \right\| - \left\| \begin{matrix} q_{1,x} - q_{2,x} \\ q_{1,y} - q_{2,y} \end{matrix} \right\|}{\left\| \begin{matrix} q^{(2)}_{1,x} - q^{(2)}_{2,x} \\ q^{(2)}_{1,y} - q^{(2)}_{2,y} \end{matrix} \right\| - \left\| \begin{matrix} q_{1,x} - q_{2,x} \\ q_{1,y} - q_{2,y} \end{matrix} \right\|}.$$

Finally, the fractional displacement $f^{(3)}$ is determined based on the distance between the Right-lip-corner 261 and Left-lip-corner 262 in the kissing-mouth action state i=3 of the face, and in the neutral state of the face, and the distance between the detected positions of those markers:

$$f^{(3)} = \frac{\left\| \begin{matrix} u_1 - u_2 \\ v_1 - v_2 \end{matrix} \right\| - \left\| \begin{matrix} q_{1,x} - q_{2,x} \\ q_{1,y} - q_{2,y} \end{matrix} \right\|}{\left\| \begin{matrix} q^{(3)}_{1,x} - q^{(3)}_{2,x} \\ q^{(3)}_{1,y} - q^{(3)}_{2,y} \end{matrix} \right\| - \left\| \begin{matrix} q_{1,x} - q_{2,x} \\ q_{1,y} - q_{2,y} \end{matrix} \right\|}.$$

Then, clip the values of the fractional displacements $f^{(1)}$, $f^{(2)}$, and $f^{(3)}$ to the range [0,1] and use the following method to determine the first three components of the action vector $(a_1, \ldots, a_5)$:

If $f^{(3)} > f^{(2)}$ and $f^{(3)} > f^{(1)}$ then $a_1 = 0$, $a_2 = 0$, and $a_3 = f^{(3)}$.

Otherwise, if $f^{(2)} > f^{(3)}$ and $f^{(2)} > f^{(1)}$ then $a_1 = 0$, $a_2 = f^{(2)}$, and $a_3 = 0$.

Otherwise, $a_1 = f^{(1)}$, $a_2 = 0$, and $a_3 = 0$.

4. Determine the fractional displacements $f_{(4)}$ and $f^{(5)}$ for raised-eyebrows and squeezed-eyebrows, respectively, as follows. The fractional displacement $f^{(4)}$ is determined based on the distance between the local markers Right-central-eyebrow 265, Left-central-eyebrow 266, and the global marker Nose-base 259 in the raised-eyebrows action state i=4 of the face, and in the neutral state of the face, and the distance between the detected positions of those markers:

$$f^{(4)} = \frac{\left\| \begin{matrix} (u_5 - u_6)/2 - x_9 \\ (v_5 - v_6)/2 - y_9 \end{matrix} \right\| - \left\| \begin{matrix} (q_{5,x} - q_{6,x})/2 - p_{9,x} \\ (q_{5,y} - q_{6,y})/2 - p_{9,y} \end{matrix} \right\|}{\left\| \begin{matrix} (q^{(4)}_{5,x} - q^{(4)}_{6,x})/2 - p_{9,x} \\ (q^{(4)}_{5,y} - q^{(4)}_{6,y})/2 - p_{9,y} \end{matrix} \right\| - \left\| \begin{matrix} (q_{5,x} - q_{6,x})/2 - p_{9,x} \\ (q_{5,y} - q_{6,y})/2 - p_{9,y} \end{matrix} \right\|}.$$

The fractional displacement $f^{(5)}$ is determined based on the distance between the Right-central-eyebrow 265 and Left-central-eyebrow 266 in the squeezed-eyebrows action state i=5 of the face, and in the neutral state of the face, and the distance between the detected positions of those markers:

$$f^{(5)} = \frac{\left\| \begin{array}{c} u_5 - u_6 \\ v_5 - v_6 \end{array} \right\| - \left\| \begin{array}{c} q_{5,x} - q_{6,x} \\ q_{5,y} - q_{6,y} \end{array} \right\|}{\left\| \begin{array}{c} q_{5,x}^{(5)} - q_{6,x}^{(5)} \\ q_{5,y}^{(5)} - q_{6,y}^{(5)} \end{array} \right\| - \left\| \begin{array}{c} q_{5,x} - q_{6,x} \\ q_{5,y} - q_{6,y} \end{array} \right\|}.$$

Then, clip the values of the fractional displacements $f^{(4)}$ and $f^{(5)}$ to the range [0,1] and use the following method to determine the last two components of the action vector $(a_1, \ldots, a_5)$:

If $f^{(5)} > f^{(4)}$ then $a_4 = 0$ and $a_5 = f^{(5)}$
Otherwise, $a_4 = f^{(4)}$ and $a_5 = 0$.

I. Determining if There is a Tracking Failure (Step 180)

If there is a large change in the global motion of the face in the current image as compared to the global motion of the face in the previous image, then it is concluded that there is a tracking failure. In a preferred embodiment of the invention, the following equation is used to calculate the change $\delta$ in the global motion in the current image with respect to the previous image:

$$\delta = \left( (c_{0,x}^f - c_{0,x}^{f-1})^2 + (c_{0,y}^f - c_{0,y}^{f-1})^2 + (\lambda^f - \lambda^{f-1})^2 / E^2 \right)^{\frac{1}{2}} +$$
$$100 \cdot (1 - |\hat{I}^f \cdot \hat{I}^{f-1}| + 1 - |\hat{J}^f \cdot \hat{J}^{f-1}| + 1 - |\hat{K}^f \cdot \hat{K}^{f-1}|).$$

In a preferred embodiment of the invention, if $\delta$ is greater than 50 then it is concluded that there is a motion failure.

J. Storing or Transmitting Global and Local Facial Motion Values (Step 190)

The calculated global motion of the face is in terms of the 3-D orientation vectors $\hat{I}^f$ and $\hat{J}^f$, the 2-D centroid $(c_{0,x}^f, c_{0,y}^f)$ of the face, and the camera-distance ratio $\lambda^f$. The superscript f denotes the chronological order number for the motion values. The following equations are used to convert the calculated global motion parameters into a more direct representation that uses a 3-D rotation matrix $R^f$ and a 3-D position vector $T^f$:

$$R^f = \begin{bmatrix} \hat{I}_x^f & \hat{I}_y^f & \hat{I}_z^f \\ \hat{J}_x^f & \hat{J}_y^f & \hat{J}_z^f \\ \hat{K}_x^f & \hat{K}_y^f & \hat{K}_z^f \end{bmatrix}, \quad T^f = \begin{bmatrix} c_{0,x}^f \\ c_{0,y}^f \\ (\lambda^f - 1)/E \end{bmatrix},$$

where $\hat{K}^f = \hat{I}^f \times \hat{J}^f$, and the subscripts x, y, and z, denote the x-, y-, and z-components of a vector.

Thus, only the global motion parameters $R^f$ and $T^f$ are stored or transmitted to describe the global motion of the face. Likewise, only the action vectors $A^f$ are stored or transmitted to describe the motion of the face.

What is claimed is:

1. A method for tracking motion of a face comprising the steps of:
   determining the calibration parameter of a camera;
   marking salient features of an object with markers for motion tracking;
   acquiring a plurality of initial 2-D images of the object;
   calculating 3-D locations of the salient features of the object in accordance with the calibration parameter of the camera;
   calculating 3-D locations of the global and local markers in the neutral state; and
   calculating 3-D locations of the local markers in each action state;
   receiving a chronologically ordered sequence of 2-D images of the object;
   storing or transmitting tracked motion of the object;
   calculating the 3-D locations of the local markers in each action state by estimating the orientation and position of the face in each 2-D image of the action state to conform to the 3-D and 2-D locations of the global markers under a perspective projection model and calculating the 3-D locations of the local markers to conform to the estimated orientation and position of the face and the 2-D locations of the local markers under a perspective projection model.

2. The method of claim 1 further comprising the steps of:
   locking onto the markers, and
   detecting loss of lock and hence the need for re-locking onto the markers.

3. The method of claim 2 comprising the further step of repeating the locking and tracking steps after the detecting step.

4. The method of claim 1 wherein the step of tracking comprises the steps of:
   determining a surface normal for each salient features;
   tracking motion of the markers on the object in each 2-D image; and
   tracking the 3-D global motion of the markers on the object in each image; and
   tracking the 3-D local motion of the markers on the object in each image.

5. The method of claim 4 wherein the step of tracking the 3-D global motion comprises the steps of:
   predicting the location of global salient features in a 2-D image;
   detecting global salient features in the 2-D image; and
   estimating the 3-D global motion of the face in the 2-D image.

6. The method of claim 5 wherein the step of predicting comprises calculating 2-D locations of the global salient features under a perspective projection model using the position and orientation of the face in a previous 2-D image, and the step of detecting comprise detecting the global markers.

7. The method of claim 6 wherein detecting the global markers comprises:
   determining visibility indices of global markers;
   designing correlation filters for the global markers;
   detecting the global markers by applying elliptical correlation filters in a neighborhood of the global markers; and
   eliminating superfluous and multiple detected locations.

8. The method of claim 6 wherein the step of estimating the 3D global motion comprises calculating the position and orientation of the face to conform to the 3D locations and the detected locations of the global markers under a perspective projection model.

9. The method of claim 4 wherein the step of tracking the 3-D local motion comprises the steps of:
predicting the location of local salient features;
detecting local salient features; and
estimating the 3-D local motion of the face.

10. The method of claim 9 wherein the local markers are placed on eyebrows and lips.

11. The method of claim 10 wherein the locations of the local markers comprise proximate ends of the eyebrows, corners of the lips, and the upper and lower centers of each lip.

12. The method of claim 11 wherein the step of predicting the locations of local markers comprises calculating the locations of the local markers using the position, orientation, and action states of the face in a previous 2-D image and the step of detecting comprise detecting the local markers.

13. The method of claim 12 wherein detecting the local markers comprise:
determining visibility indices of local markers;
designing correlation filters for the local markers;
detecting the local makers by applying elliptical correlation filters in a neighborhood of the local markers; and
eliminating superfluous and multiple detected locations.

14. The method of claim 13 wherein the step of estimating comprises:
finding 3-D locations of local markers to conform to the detected 2-D locations of the local markers;
calculating an action vector representing the weights of the facial actions in the 2-D image conforming to the found 3-D locations of the local markers and the 3-D locations of the local markers for the neutral and the action states under a perspective projection model.

15. The method of claim 14 wherein the step of calculating an action vector comprises the steps of:
calculating the difference between the 2-D locations of the local markers detected in an image and the 2-D locations of the same markers corresponding to the neutral face;
modifying the difference to conform to the orthographic projection;
calculating the 3-D displacements of the local markers with respect to their location in the neutral face; and
calculating the amount of facial actions conforming to the 3-D displacements of the local markers.

16. The method of claim 14 wherein the step of calculating an action vector comprises the steps of:
calculating the 2-D locations of the local markers corresponding to the neutral face using the global motion found for the current image;
calculating the 2-D locations of the local markers corresponding to the action faces using the global motion found for the current image;
calculating the distance between the detected locations, the distance between the neutral locations, and the distance between the action locations of the markers at the right and left corners of the lips;
calculating the distance between the detected locations, the distance between the neutral locations, and the distance between the action locations of the markers at the upper and lower center of lips;
calculating the distance between the detected locations, the distance between the neutral locations, and the distance between the action locations of the markers at the proximate ends of the eyebrows;
determining the fractional displacements of the local markers for the lips area and for the eyebrows area; and
determining action mode and amount for the lips area and for the eyebrows area based on the fractional displacements of the local markers.

17. The method of claim 1 wherein a first set of markers identifies global motion and a second set of markers identifies local motion of the face.

18. The method of claim 17 wherein the markers comprise at least two colors.

19. The method of claim 18 wherein the two colors are contrasting.

20. The method of claim 19 wherein the colors are black and white.

21. The method of claim 1 wherein the markers comprise two concentric circles of different colors.

22. The method of claim 21 wherein the outer circle has a diameter at least twice the diameter of the inner circle.

23. The method of claim 1 wherein the step of selecting comprises wearing a head-set with markers.

24. The method of claim 23 wherein the head set comprises a strap for a chin.

25. The method of claim 23 wherein the head-set comprises a strap for eyebrows.

26. The method of claim 23 wherein the head-set comprises at least one strap for a skull.

27. The method of claim 1 wherein the acquired 2-D images include at least two views of the face with markers in a neutral state at different orientations.

28. The method of claim 27 wherein the two views are orthogonal.

29. The method of claim 1 wherein the acquired 2-D images comprise front, forehead, chin, angled-right, angled-right-tilted-up, angled-right-tilted-down, angled-left, angled-left-tilted-up, angled-left-tilted-down, full-right-profile, full-right-profile-tilted-up, full-right-profile-tilted-down, full-left-profile, full-left-profile-tilted-up, and full-left-profile-tilted-down views of the face with markers in the neutral state.

30. The method of claim 1 wherein the acquired 2-D images comprise front, forehead, chin, full-right-profile, and full-left-profile views of the face with markers in the neutral state.

31. The method of claim 1 wherein the acquired 2-D images include a plurality of views of the face with markers in at least one action state.

32. The method of claim 31 wherein the action states of the face comprise smiling lips, kissing lips, yawning lips, raised eyebrows, and squeezed eyebrows.

33. The method of claim 31 wherein the acquired 2-D images of the face in an action state include at least two views at different orientations.

34. The method of claim 33 wherein the two views are front and angled-right.

35. The method of claim 1 wherein the step of calculating the 3-D locations of the global and local markers in the neutral state comprises the steps of:
calculating the 3-D locations of the markers to conform to their 2-D locations in the 2-D images of the face in the neutral state under an orthographic projection model;
calculating relative distances of the face to the camera in the 2-D images to conform to the 2-D locations of the markers and their calculated 3-D locations under a perspective projection model;

modifying the 2-D locations of the markers to conform to the calculated relative distances and the 3-D locations under a perspective projection model;

recalculating the 3-D locations of the markers to conform to their modified 2-D locations under an orthographic projection model;

repeating the steps of calculating the relative distances, modifying the 2-D locations, and recalculating the 3-D locations to satisfy a convergence requirement; and translating and rotating the 3-D locations so that they correspond to a frontal-looking face.

36. A method for tracking motion of an object in a chronologically ordered sequence of 2-D images of the object comprising the steps of:

selecting global and local salient features of the object for tracking by fixing markers to the object;

calculating 3-D locations of the markers at the global and local salient features for a neutral state of the object, and calculating 3-D locations of the local salient features for action states of the object;

calculating the 3-D locations of the global and local markers in a neutral state; and calculating the 3-D locations of the local markers in each action state by estimating the orientation and position of the face in each 2-D image of the action state to conform to the 3-D and 2-D locations of the global markers under a perspective projection model and calculating the 3-D locations of the local markers to conform to the estimated orientation and position of the face and the 2-D locations of the local markers under a perspective projection model;

predicting 2-D locations of the markers at the global and local salient features in a 2-D image;

detecting 2-D locations of the markers at the global and local salient features in the 2-D image; and estimating the global and local motion of the object in the 2-D image.

37. The method of claim 36 where the action states of the object define maximum local motions of the object.

38. The method of claim 37 where the method of calculating comprises:

acquiring a plurality of initial 2-D images of the object in neutral state;

acquiring a plurality of initial 2-D images of the object in action states identifying the 2-D locations of the salient features in each initial 2-D image;

estimating the orientation and position of the object in each initial 2-D image to conform to the 2-D locations of the salient features under a perspective projection model; and calculating 3-D locations of the salient features to conform to the 2-D locations of the salient features under a perspective projection model.

39. The method of claim 36 wherein a first set of markers define global salient features and a second set of markers define local salient features.

40. The method of claim 36 wherein the step of estimating global motion comprises calculating 3-D position and orientation of the object to conform to the 3-D locations of the global markers in the neutral state and the detected 2-D locations of the global markers under a perspective projection model.

41. The method of claim 36 wherein the step of estimating local motion comprise calculating a vector of weights representing fractions of maximum actions of the object conforming to the 3-D locations of local markers in the neutral and action states and the detected 2-D locations of the local markers under a perspective projection model.

42. The method of claim 36 wherein the object is a face.

43. The method of claim 36 wherein the markers comprise concentric circles with two contrasting colors.

44. The method of claim 43 wherein the step of detecting comprises applying elliptical correlation filters in a neighborhood of the markers.

* * * * *